US007817889B2

United States Patent
(12) United States Patent
Miyadera et al.

(10) Patent No.: US 7,817,889 B2
(45) Date of Patent: Oct. 19, 2010

(54) OPTICAL WAVEGUIDE STRUCTURE, OPTICAL-WAVEGUIDE-TYPE OPTICAL MODULE AND OPTICAL FIBER ARRAY

(75) Inventors: Nobuo Miyadera, Tsukuba (JP); Rei Yamamoto, Tsukuba (JP); Shigeyuki Yagi, Tsukuba (JP)

(73) Assignee: Hitachi Chemical Company, Ltd., Tokyo (JP)

(*) Notice: Subject to any disclaimer, the term of this patent is extended or adjusted under 35 U.S.C. 154(b) by 0 days.

(21) Appl. No.: 11/640,380

(22) Filed: Dec. 18, 2006

(65) Prior Publication Data

US 2007/0154145 A1 Jul. 5, 2007

Related U.S. Application Data

(63) Continuation of application No. PCT/JP2005/011039, filed on Jun. 16, 2005.

(30) Foreign Application Priority Data

Jun. 16, 2004 (JP) ............................ 2004-178731
Jul. 1, 2004 (JP) ............................ 2004-195566

(51) Int. Cl.
*G02B 6/30* (2006.01)
*G02B 6/26* (2006.01)
*G02B 6/00* (2006.01)

(52) U.S. Cl. ............................ 385/49; 385/52; 385/132

(58) Field of Classification Search ....................... None
See application file for complete search history.

(56) References Cited

U.S. PATENT DOCUMENTS 5,091,986 A * 2/1992 Arii et al. .................... 385/48
5,559,914 A * 9/1996 Asakura ...................... 385/49
5,778,120 A * 7/1998 Asakura et al. ............... 385/49

(Continued)

FOREIGN PATENT DOCUMENTS

FR 2746406 9/1997

(Continued)

OTHER PUBLICATIONS

Hauffe, et al. "Methods for Passive Fiber Chip Coupling of Integrated Optical Devices", IEEE Transactionson Advanced Packaging, Nov. 2001, vol. 24, No. 4, pp. 450-455.

*Primary Examiner*—Michelle R Connelly Cushwa
(74) *Attorney, Agent, or Firm*—Antonelli, Terry, Stout & Kraus, LLP.

(57) ABSTRACT

An optical waveguide structure comprises a substrate (12) having first and second groove arrays (8, 10), including grooves (8*a*-8*g*, 10*a*-10*h*), and an optical waveguide (14), having cladding and core (14*b*) layered on the substrate between the groove arrays to vertically align the core with cores (2*a*, 4*a*) of optical fibers (2, 4) positioned on the grooves. The waveguide has at least one first port (20) aligned with a groove (8*d*) of the first groove array and at least one second port (22) aligned with a groove (10*e*) of the second groove array. The number of second ports is equal to or greater than that of the first ports. A ratio of the number of grooves of the second groove array relative to the number of grooves of the first groove array is less than a ratio of the number of the second ports relative to the number of first ports.

16 Claims, 21 Drawing Sheets

U.S. PATENT DOCUMENTS 5,859,943 A * 1/1999 Asakura et al. ............... 385/49
2002/0001435 A1 1/2002 Steinberg et al.
2003/0012833 A1 1/2003 Freissle et al.
2003/0091289 A1* 5/2003 Saito et al. .................... 385/49
2005/0180716 A1* 8/2005 Crafts ........................ 385/137
2005/0284181 A1* 12/2005 Smith et al. .................. 65/386

FOREIGN PATENT DOCUMENTS

JP 06-235840 8/1994
JP 08-334647 12/1996
JP 09-005569 1/1997
JP 09005569 A * 1/1997
JP 09-090171 4/1997
JP 11-006938 1/1999
JP 11-125731 5/1999
JP 2001-083361 3/2001
JP 2002-139641 5/2002
JP 2003-302545 10/2003
JP 2004-020656 1/2004
JP 2004-078028 3/2004
JP 2005-308918 11/2005

* cited by examiner 10
1
II
III
4
4a
10a
10b
10c
10d
10e
10f
10g
10h
28
12
12c
6
12e
18
22
24c
24b
14b
14
16
24a
20
12b
12d
12a
34a
8a
8b
8c
8d
2
2a
8e
8f
8g
26
34b
8

| | MAXIMUM VALUE | MINIMUM VALUE | FLUCTUATION RANGE OF INSERTION LOSS |
|---|---|---|---|
| ------ 1550nm FLUCTUATION | 0. 05dB | −0. 21dB | 0. 26dB |
| —— 1310nm FLUCTUATION | 0. 18dB | −0. 08dB | 0. 26dB |
| ---- TEMPERATUE | | | |

| | MAXIMUM VALUE | MINIMUM VALUE | FLUCTUATION RANGE OF INSERTION LOSS |
|---|---|---|---|
| ------ 1550nm FLUCTUATION | 0. 20dB | −0. 33dB | 0. 53dB |
| —— 1310nm FLUCTUATION | 0. 04dB | −0. 64dB | 0. 68dB |
| —-—- TEMPERATUE PV | | | |

100
104
104a
XII
114c
108b
114e
122
112
116a
116b
116
114
106
114b
X
120
114d
114a
XI
108a
132b
110
102
126
WC
102a
W 100
112
108a
114a
110
132a
138
102
102a
126
136
108c
132b
138
124
140
134

112
108b
114c
104a
104
104
104a
136
130
134
130
128

140
110
104
104a
114c
108b
114e
112
122
116a
116b
116
114
106
114b
120
114d
114a
108a
102
102a
WC
W 150
158
104a
176
158
130
180
160
178
122
162
116a
116b
166
156
164
XV
162
120
154
XVI
170
XVI
172
152
172
102a
WC
XV
W

200
XVIII
XIX
204
204a
210a
210b
210c
210d
210e
210f
210g
210h
212
222
224c
224b
224a
214b
206
214
220
208
202
202a 300
304
304a
308b
310
306
314a
314
XXI
310
308a
XXII
XXII
302
302a
XXI
W 310
316
308a
312 (306)
302
302a
318
322

OPTICAL WAVEGUIDE STRUCTURE, OPTICAL-WAVEGUIDE-TYPE OPTICAL MODULE AND OPTICAL FIBER ARRAY

This application a Continuation application, under 35 USC 365(c), of prior International (PCT) Application No. PCT/JP2005/011039, filed Jun. 16, 2005.

FIELD OF THE INVENTION

The present invention relates to an optical waveguide structure which is a component of an optical-waveguide-type optical module, the optical-waveguide-type optical module itself, and an optical fiber array configured to be coupled to an optical waveguide so as to form an optical module. More specifically, the present invention relates to an optical waveguide structure in which an optical waveguide configured to be coupled to an optical fiber is layered on a substrate formed with a groove for positioning the optical fiber, and an optical-waveguide-type optical module including the above-stated optical waveguide structure. Further, the present invention relates to an optical waveguide structure, an optical-waveguide-type optical module, and an optical fiber array, each of which having a groove for supporting an optical fiber.

BACKGROUND OF THE INVENTION

Conventionally, an optical waveguide structure in which an optical waveguide configured to be coupled to an optical fiber is layered on a substrate formed with a groove for positioning the optical fiber, and an optical-waveguide-type optical module including the optical waveguide structure have been known (see the Patent Publication 1 below).

Further, conventionally, an optical waveguide structure which is a component of an optical-waveguide-type optical module, an optical-waveguide-type optical module, and an optical fiber array configured to be coupled to an optical waveguide so as to form an optical module have been known. Particularly, the optical waveguide structure, the optical-waveguide-type optical module, and the optical fiber array, each of which having a groove for supporting an optical fiber, have been known (see the Patent Publication 1 below).

Referring to FIGS. 17-19, a first example of a conventional optical waveguide structure will be explained. FIG. 17 is a top plan view showing an optical-waveguide-type optical module including a conventional optical waveguide structure. FIG. 18 is a fragmentary enlarged cross-sectional view taken along the line XVIII-XVIII in FIG. 17, and FIG. 19 is a fragmentary enlarged cross-sectional view taken along the line XIX-XIX in FIG. 17.

As shown in FIGS. 17-19, an optical-waveguide-type optical module 200 having a single upstream optical fiber 202 extending longitudinally, eight downstream optical fibers 204 spaced longitudinally from the upstream optical fiber 202 and arranged laterally relative to each other, and an optical waveguide structure 206 for transmitting light through the upstream optical fiber 202 to the downstream optical fibers 204. The upstream optical fiber 202 and the downstream optical fibers 204 include respective cores 202*a*, 204*a* extending longitudinally.

The optical waveguide structure 206 has a substrate 212 on which a single upstream groove 208 extending longitudinally and eight downstream grooves 210*a*-210*h* extending longitudinally and spaced longitudinally from the upstream groove 208 are provided, and an optical waveguide 214 layered on the substrate 212 between the upstream groove 208 and the downstream grooves 210*a*-210*h*. The upstream optical fiber 202 is positioned on the upstream groove 208, and the downstream optical fibers 204 are positioned on the downstream grooves 210*a*-210*h*.

The optical waveguide 214 includes a lower cladding 214*a* layered on the substrate 212, a core 214*b* formed on the lower cladding 214*a*, and an upper cladding 214*c* layered on the lower cladding 214*a* and the core 214*b*. The core 214*b* of the optical waveguide 214 is formed so that, when the optical fibers 202, 204 are supported and positioned on the upstream groove 208 and the downstream grooves 210*a*-210*h*, the core 214*b* of the optical waveguide 214 is aligned with the cores 202*a*, 204*a* of the optical fibers 202, 204 at the same level in an vertical direction.

Further, for light transmission between the upstream optical fiber 202 positioned on the upstream groove 208 and each of the downstream optical fibers 204 positioned on the downstream grooves 210*a*-210*h*, the core 214*b* of the optical waveguide 214 has a single upstream port 220 aligned with the upstream groove 208 and eight downstream ports 222 each aligned with the respective downstream grooves 210*a*-210*h*. In the illustrated optical waveguide structure 206, the core 214*b* of the optical waveguide 214 extends from the single upstream port 220, is branched toward a downstream side, and terminates at the eight downstream ports 222. The optical waveguide 214 has an upstream portion 224*a* adjacent to the upstream port 220, an intermediate portion 224*b* between the upstream port 220 and the downstream ports 222, and a downstream portion 224*c* adjacent to one of the downstream ports 222.

Light transmitted through the single upstream optical fiber 202 is transmitted from the upstream port 220 to the optical waveguide 214 and branched toward the downstream side. Then, the branched lights are transmitted from the eight downstream ports 222 to the eight downstream optical fibers 204. In this case, the optical-waveguide-type optical module 200 serves as an optical splitter. On the contrary, when light is traveled in the opposite direction from the downstream optical fibers 204 to the upstream optical fiber 202, the optical-waveguide-type optical module 200 serves as an optical coupler.

Referring to FIGS. 20-22, a second example of the conventional optical waveguide structure which is a component of an optical-waveguide-type optical module will be explained. FIG. 20 is a top plan view showing an optical-waveguide-type optical module including the conventional optical waveguide structure. FIG. 21 is a fragmentary enlarged cross-sectional view taken along the line XXI-XXI in FIG. 20, and FIG. 22 is a fragmentary enlarged cross-sectional view taken along the line XXII-XXII in FIG. 20.

As shown in FIGS. 20-22, an optical-waveguide-type optical module 300 has a single upstream optical fiber 302 extending longitudinally, eight downstream optical fibers 304 spaced longitudinally from the upstream optical fibers 302 and arranged laterally relative to each other, and an optical waveguide structure 306 for supporting the upstream optical fiber 302 and the downstream optical fibers 304 and transmitting light through the single upstream optical fiber 302 to the eight downstream optical fibers. The optical-waveguide-type optical module 300 further has two fiber-holding lids 308*a*, 308*b* which respectively hold the upstream optical fiber 302 and the downstream optical fibers 304 against the optical waveguide structure 306, and an adhesive 310 filled between any two of the optical fibers 302, 304, the optical waveguide structure 306 and the fiber-holding lids 308*a*, 308*b* to fix them relative to each other.

The upstream optical fiber 302 and the downstream optical fibers 304 have respective cores 302*a*, 304*a* extending longitudinally. The optical waveguide structure 306 has a substrate 312 and an optical waveguide 314 layered thereon. The substrate 312 has an upper surface 316 with a lateral width W, and a plurality of grooves 318 for supporting the upstream optical fiber 302 and the downstream optical fibers 304 are formed in the upper surface 316. The optical waveguide 314 includes a core 314*a* which is formed so that, when the optical fibers 302, 304 are supported and positioned on the grooves 318, the core 314 of the optical waveguide 314 is aligned with the cores 302*a*, 304*a* of the optical fibers 302, 304. Each of the fiber-holding lids 302, 304 has the same width as that of the substrate 312, and is provided with (a) contact groove(s) 322 contacting with the optical fiber(s) 302, 304.

Light transmitted through the single upstream optical fiber 302 is transmitted to the optical waveguide 314, and branched toward a downstream side. Then, the branched lights are transmitted to the eight downstream optical fibers 304. In this case, the optical-waveguide-type optical module 300 serves as an optical splitter. On the contrary, when light is traveled in the opposite direction from the downstream optical fibers 304 to the upstream optical fiber 302, the optical-waveguide-type optical module 300 serves as an optical coupler.

When light is transmitted from the upstream optical fiber 302 to the optical waveguide 314 and transmitted from the optical waveguide 314 to the downstream optical fibers 304, a loss of optical power to be transmitted, called an insertion loss, is caused.

Patent Publication 1: Japanese Patent Laid-Open Publication No. 11-125731

In the above optical-waveguide-type optical module 200 which is the first conventional example, when light is transmitted from the upstream optical fiber 202 to the optical waveguide 214 and transmitted from the optical waveguide 214 to the downstream optical fibers 204, a loss of optical power to be transmitted, called an insertion loss, is caused. The insertion loss is a ratio of a downstream output optical power (Po) relative to an upstream input optical power (Pi) expressed in deci Bell unit, i.e., $(10 \log_{10} (Po/Pi))$. An amount of the insertion loss of the optical-waveguide-type optical module 200 is preferable as small as possible. In a case of the optical module according to the present invention where there is no gain such as amplifying performance, i.e., $Po<Pi$, a value of the insertion loss expressed in deci Bell unit based on the above formula is negative. When there is no insertion loss, the value thereof based on the above formula is 0 (zero). Thus, in this specification, a small insertion loss means that a negative value calculated by the above formula is large, namely, an absolute value thereof is close to 0 (zero), as with common practice. Such insertion loss can be applied to a case including both of an insertion loss and a gain. In this case, the insertion loss can be considered after a part of the gain is separated. Therefore, an optical waveguide structure is needed, which structure can reduce an amount of insertion loss of an optical-waveguide-type optical module thereof as compared with the conventional optical waveguide structure.

An amount of insertion loss of the optical-waveguide-type optical module 200 shown in FIGS. 17-19, i.e., that of insertion loss between the upstream optical fiber 202 and the optical waveguide 214 or that of insertion loss between the optical waveguide 214 and the downstream optical fibers 204, may be changed depending on changes in an environmental temperature. Particular, since an optical splitter and an optical coupler which are examples of the optical-waveguide-type optical module are used as a part of the Internet with an optical fiber network disposed outside, an environmental temperature thereof may vary, for example, from −40° C. to +85° C. When insertion loss of such an optical-waveguide-type optical module is fluctuated due to variations in the environmental temperature, the optical module may not be able to give its original performance. The fluctuation of the insertion loss of the optical-waveguide-type optical module due to the change in the environmental temperature is preferably as small as possible. Thus, it is desirable to provide an optical waveguide structure capable of reducing fluctuation of an insertion loss of an optical-waveguide-type optical module as compared with that of the conventional optical-waveguide-type optical module.

In the above optical-waveguide-type optical module 300 which is the second conventional example, the upstream fiber-holding lid 308*a* is likely to be fixed to the optical fiber in a state laterally inclined relative to the substrate 312 (see FIG. 22). In this case, on the opposite sides of the upstream optical fiber 302, distances between the fiber-holding lid 308*a* and the upper surface 316 of the substrate 312 are different from each other as well as thicknesses of the adhesive 310 are different from each other.

As mentioned above, an optical splitter and an optical coupler, which are examples of the optical-waveguide-type optical module 300, are used as a part of the Internet with the optical fiber network placed outdoor. An environmental temperature around the optical module 300 may be changed, for example, from −40° C. to +85° C. When the environmental temperature is changed, each of the substrate 312, the fiber-holding lid 308*a* and the adhesive 310 expands and contracts according to their thermal expansion coefficients which are different from each other. Thus, when thicknesses of the adhesive 310 are different from each other on the opposite sides of the upstream optical fiber 302 and the environmental temperature is changed, the upstream optical fiber is subjected to uneven stress, resulting in deterioration of an insertion loss. Fluctuation of the insertion loss of the optical-waveguide-type optical module 300 when the environmental temperature is changed is preferably as small as possible.

Thus, there is a need to provide an optical waveguide structure which is a component of an optical-waveguide-type optical module and is capable of reducing fluctuation of an insertion loss thereof when an environmental temperature is changed. Further, there is a need to provide an optical-waveguide-type optical module capable of reducing fluctuation of an insertion loss thereof when an environmental temperature is changed.

Furthermore, there is a need to provide an optical fiber array configured to be coupled to an optical waveguide so as to form an optical module, the optical fiber array being capable of reducing fluctuation of an insertion loss of the optical module when an environmental temperature is changed.

It is therefore a first object of the present invention to provide an optical waveguide structure capable of reducing an insertion loss of an optical-waveguide-type optical module including the optical waveguide structure as compared with the conventional optical waveguide structure, and to provide the optical-waveguide-type optical module itself.

Further, it is a second object of the present invention to provide an optical waveguide structure capable of reducing fluctuation of an insertion loss of an optical-waveguide-type optical module including the optical waveguide structure when an environmental temperature is changed, and to provide the optical-waveguide-type optical module itself.

Further, it is a third object of the present invention to provide an optical fiber array configured to be coupled to an optical waveguide so as to form an optical module, the optical fiber array being capable of reducing fluctuation of an insertion loss of the optical module when an environmental temperature is changed.

SUMMARY OF THE INVENTION

The inventors of the present invention reviewed the aforementioned conventional optical waveguide structure 206 in detail. As the result, the inventors found that thicknesses of the upstream portion 224*a* and the downstream portion 224*c* of the lower cladding 214*a* of the optical waveguide 214 are strictly different from each other and this difference affects an increase in the insertion loss. The present invention has been made by trying hard to bring thicknesses of the lower cladding layered on the substrate close to each other at different ports aligned with grooves on which optical fibers are mounted.

In order to achieve the first and second objects, an optical waveguide structure according to a first aspect of the present invention is an optical waveguide structure comprising a substrate having a first groove array and a second groove array which are longitudinally spaced from each other, each groove array including a plurality of grooves extending longitudinally and arranged laterally relative to each other; and an optical waveguide layered on the substrate between the first and second groove arrays; wherein the optical waveguide has a cladding layered on the substrate, and a core formed on the cladding so that, when optical fibers are supported and positioned on the grooves of the first and second groove arrays, the core of the optical waveguide is aligned with cores of the optical fibers at the same level in an vertical direction; wherein, in order to allow light transmission between optical fibers positioned at the respective first and second groove arrays, the optical waveguide has at least one first port aligned with (a) groove(s) of the first groove array, and at least one second port aligned with (a) groove(s) of the second groove array, the number of the second port being equal to or greater than that of the first port; and wherein a ratio of the number of the grooves of the second groove array relative to the number of the grooves of the first groove array is less than a ratio of the number of the second ports relative to the number of the first ports.

In this optical waveguide structure, after the first groove array and the second groove array are formed in the substrate, the cladding of the optical waveguide is layered on the substrate between the first and second groove arrays, and then the core is layered on the cladding. The core of the optical waveguide is formed so that, when optical fibers are supported and positioned on the grooves of the first and second groove arrays, the core of the optical waveguide is aligned with cores of the optical fibers at the same level in the vertical direction. Thus, light transmitted through an optical fiber positioned on the groove of the first groove array enters the first port of the optical waveguide and, for example, is transmitted through the second port to another optical fiber positioned on the grooves of the second groove array.

An insertion loss caused from an excess loss between the optical fiber positioned on the groove of the first groove array and the optical waveguide and that between the optical waveguide and the optical fiber positioned on the groove of the second groove array become lower, as levels of the core of the optical waveguide in the vertical direction at the first and second ports are brought closer to those of the cores of the optical fibers in the vertical direction. In other words, when a thickness of the cladding at the first port (a first port cladding thickness) is proper, but a thickness of the cladding at the second port (a second port cladding thickness) is different from the first port cladding thickness, the second port cladding thickness is not a thickness to properly align the core of the waveguide with the core of the optical fiber, causing an insertion loss of the optical-waveguide-type optical module. The inventors of the present invention has found that the first port cladding thickness is affected by number of and/or an interval between the grooves of the first groove array, while second port cladding thickness is affected by number of and/or an interval between the grooves of the second groove array.

For example, in a conventional optical waveguide structure (an 1×8 optical splitter) where the number of downstream ports (second ports) is greater than that of upstream ports (first ports), the same number of grooves (e.g., one groove of the first groove array) are provided as that of the upstream ports (e.g., one first port), while the same number of grooves (e.g., eight grooves of the second groove array) are provided as that of the downstream ports (e.g., eight second ports). The number of the grooves of the first groove array (first grooves) is one and no adjacent grooves are provided. The number of the grooves of the second groove array (second grooves) is greater than that of the first grooves, and the second grooves are arranged at even intervals. Since the numbers of the first and second grooves and the intervals between the first and second grooves are different from each other, the first port cladding thickness and the second port cladding thickness are different from each other. Thus, there is room for reduction in the above-stated insertion loss. In this case, a ratio of the number of the second grooves relative to that of the first grooves (e.g., eight) is equal to a ratio of the number of the second ports relative to that of the first ports (e.g., eight).

On the contrary, in the present invention, by bringing the number of and/or the interval between the first grooves to bring closer to the number of and/or the interval between the second grooves, for example, by increasing the number of the first grooves, the first port cladding thickness can be brought closer to the second port cladding thickness. For example, two first grooves are provided relative to one upstream port (one first port), while eight second grooves are provided relative to eight downstream ports (eight second ports). In this case, a ratio of the number of the second grooves relative to that of the first grooves is four, while a ratio of the number of the second ports relative to that of the first ports is eight, and thus the former ratio is smaller than the latter ratio.

This makes it possible to reduce above-stated insertion loss of the optical-waveguide-type optical module including the optical waveguide structure as compared with the conventional optical-waveguide-type optical module. Additionally, fluctuation of the insertion loss of the optical-waveguide-type optical module including the optical waveguide structure can be reduced when an environmental temperature is changed.

For example, in another conventional optical waveguide structure (a pitch converter of fours channels) where the number of upstream ports (first ports) is equal to that of downstream ports (second ports), the same number of grooves (e.g., four grooves of the first groove array) are provided as that of the upstream ports (e.g., four first port), while the same number of grooves (e.g., four grooves of the second groove array) are provided as that of the downstream ports (e.g., four second ports). Further, pitches of the downstream ports are smaller than that of the upstream ports, and the grooves of the first groove arrays (first grooves) and the grooves of the second groove array (second grooves) are arranged at respective even intervals. Thus, the pitch or interval of the first grooves is greater than that of the second grooves.

Since the interval of the first grooves and that of the second grooves are different from each other, thicknesses of the cladding at the first port (a first port cladding thickness) and the second port (a second port cladding thickness) are different from each other. Thus, this is room for reduction in the above-stated insertion loss. In this case, a ratio of the number of the second grooves relative to that of the first grooves (e.g., one) is equal to a ratio of the number of the second ports relative to that of the first ports (e.g., one).

On the contrary, in the present invention, by bringing the interval between the first grooves closer to the interval between the second grooves, for example, by increasing the number of the first grooves, the first port cladding thickness can be brought closer to the second port cladding thickness. For example, seven first grooves are provided by adding three new grooves to the four first grooves so that the new grooves and the first grooves are alternately arranged each other, while four second grooves are provided relative to four downstream ports (four second ports). In this case, a ratio of the number of the second grooves relative to that of the first grooves is 4/7, while a ratio of the number of the second ports relative to that of the first ports is one, and thus the former ratio is smaller than the latter ratio.

This makes it possible to reduce above-stated insertion loss of the optical-waveguide-type optical module including the optical waveguide structure as compared with the conventional optical-waveguide-type optical module. Additionally, fluctuation of the insertion loss of the optical-waveguide-type optical module including the optical waveguide structure can be reduced when an environmental temperature is changed.

In an embodiment of the present invention, preferably, the grooves of the second groove array are arranged at even intervals; the grooves of the first groove array includes an aligned groove aligned with the first port, and two side grooves arranged adjacent to the aligned groove on the opposite sides thereof and equally spaced therefrom in a lateral direction; and at least one of the side grooves is located out of alignment with any first ports.

In this optical waveguide structure, the aligned groove which is one of the grooves of the first groove array (first grooves) is mostly affected by the side grooves arranged adjacent thereto on the opposite sides thereof. Since the grooves of the second groove array (second grooves) are arranged at even intervals, each of the second grooves is evenly affected by two other second grooves which are arranged adjacent thereto on the opposite sides thereof and equally spaced therefrom. This makes it possible to equalize thicknesses of the cladding of the optical waveguide at the second ports so as to reduce an insertion loss of an optical-waveguide-type optical module.

Further, while the conventional optical waveguide structure has no grooves on the opposite sides of the groove aligned with the first port, the optical waveguide structure according to the present invention has two side grooves arranged on the opposite sides of the aliened groove of the first groove array and equally spaced therefrom. That is, the number of the first grooves and the interval therebetween are respectively brought closer to the number of the second grooves and the interval therebetween. Thus, the aligned groove is evenly affected by the two side grooves arranged on the opposite sides thereof and equally spaced therefrom so that the first port cladding thickness is brought closer to the second port cladding thickness. This makes it possible to reduce an insertion loss of an optical-waveguide-type optical module.

When the number of the first port is three or more, and both of the two side grooves are aligned with the respective first ports, the optical waveguide structure is of conventional.

In this embodiment of the present invention, preferably, the interval between the aligned groove and the side groove is equal to that of the grooves of the second groove array adjacent to each other.

In this optical waveguide structure, since the interval between the aligned groove and the side groove is equal to that of the grooves of the second groove array, the first port cladding thickness can be brought closer to that of the second port cladding thickness. This makes it possible to reduce an insertion loss of the optical-waveguide-type optical module further.

In an embodiment of the present invention, preferably, the grooves of each of the first groove array and the second groove array are arranged over the entire width of the optical waveguide structure at even intervals, and the intervals of the grooves of the first groove array are equal to those of the grooves of the second groove array.

In this optical waveguide structure, since the first grooves and the second grooves are arranged over the entire width of the optical waveguide structure at even intervals, the first port cladding thickness can be brought closer to the second port cladding thickness. This makes it possible to reduce the insertion loss of the optical-waveguide-type optical module further.

Further, in a substrate formed with only the first groove array and the second groove array to simultaneously form a plurality of optical waveguide structures, the first port cladding thicknesses and the second port cladding thickness can be brought closer to each other than those of the conventional optical waveguide structure regardless of locations of the first and second ports for optical fibers.

In this embodiment of the present invention, preferably, the grooves of the first groove array and the grooves of the second groove array are laterally shifted from each other and alternately arranged.

In this optical waveguide structure, light leakage between optical fibers positioned on the first grooves and optical fibers positioned on the second grooves can be reduced. Specifically, light from an input optical fiber positioned on a groove of the first groove array should be input into the first port. However, due to mismatching of a mode field, axial misalignment, tilt and/or gap, a portion of the light which does not enter the first port or the core of the optical waveguide may be transmitted through the cladding of the optical waveguide and/or the substrate and enter an output optical fiber positioned on a groove of the second groove array, which groove of the second groove array is opposing to the groove of the first groove array. This transmission becomes prominent when the input and output optical fibers are coaxially disposed. Thus, by laterally shifting the grooves of the first groove array and the grooves of the second groove array from each other so that they are not coaxially arranged, light leakage can be reduced.

In an embodiment of the present invention, preferably, the cladding and the core of the optical waveguide are made of polymer.

In order to achieve the above first and second objects, an optical-waveguide-type optical module comprises one of the above-stated optical waveguide structures; a first optical fiber positioned on the groove of the first groove array and aligned with the first port; and a second optical fiber positioned on the grooves of the second groove array and aligned with the second port.

Further, in order to achieve the above first and second objects, an optical waveguide structure according to a second aspect of the present invention is an optical waveguide structure comprising a substrate having grooves extending longitudinally; and an optical waveguide layered on the substrate and arranged longitudinally relative to the grooves adjacent thereto; wherein the optical waveguide has a cladding layered on the substrate, a core formed on the cladding; wherein, the core of the optical waveguide has at least one first port and at least one second port which are provided to allow light to be transmitted between core of optical fibers mounted on the grooves and the core of the optical waveguide; wherein the grooves include a first aligned groove aligned with the first port, a side groove arranged laterally adjacent to the first aligned groove, a second aligned groove aligned with the second port; and a non-aligned groove arranged laterally adjacent to the second aligned groove, the non-aligned groove being located out of alignment with any ports of the core of the waveguide so that a thickness of the cladding at the second port is brought closer to that of the cladding at the first port.

In this optical waveguide structure of the present invention, after the grooves are formed in the substrate, the cladding of the optical waveguide is layered on the substrate longitudinally adjacent to the grooves, and then the core is layered on the cladding. The core of the optical waveguide has a first port and a second port, which ports are formed so that light is transmitted between the core of the waveguide and the cores of the optical fibers positioned on the grooves. For example, light transmitted through an optical fiber is transmitted through the first port, the optical waveguide and the second port to another optical fiber.

An insertion loss between the optical fiber positioned on the groove and the port of the optical waveguide becomes lower as a level of the core of the optical fiber in the vertical direction becomes closer to that of the core of the optical waveguide in the vertical direction at the port. The inventors of the present invention has found that a thickness of the cladding of the optical waveguide at the port is affected by a distance or pitch between a groove aligned with the port (a port-aligned groove) and (an) adjacent groove(s) arranged laterally adjacent to the port-aligned groove, and by shapes and dimensions, such as widths, lengths and depths, of the port-aligned groove and the adjacent groove(s).

Since the first aligned groove aligned with the first port is laterally adjacent to the side groove, a thickness of the cladding at the first port is affected by the side groove. By providing the non-aligned groove arranged laterally adjacent to the second aligned groove aligned with the second port and located out of alignment with any other ports of the core, a thickness of the cladding at the first port can be brought closer to a thickness of the cladding at the second port as compared with a optical waveguide structure without such a non-aligned groove. The side groove may be aligned with or located out of alignment with any one of the ports of the core. The non-aligned groove should be a complete groove when it is formed, but may remain only a half of the complete groove in the optical waveguide structure.

For example, in a conventional optical waveguide structure (an optical splitter) having one input port (a second port) and a plurality of output ports (first ports), one input groove (a second aligned groove) is formed relative to the one input port (one second port), while the same number of output grooves (a first aligned groove, a side groove and other grooves) are formed as that of the plurality of output ports (first ports). In this case, since no groove is disposed adjacent to the one input groove (the second aligned groove), the input groove is not affected by any other grooves. On the contrary, the plurality of output grooves (first aligned groove, a side groove and other grooves) are affected by each other. Thus, a thickness of the cladding at the input port (the second port) is different from a thickness of the cladding at the output port (the first port), so that there is room for reduction in the above-stated insertion loss.

In the present invention, by providing the non-aligned groove arranged adjacent to the input groove (the second aligned groove) and located out of alignment with any other ports, the thickness of the cladding at the input port (the second port) can be brought closer to the thickness of the cladding at the output port (the first port). This makes it possible to reduce an insertion loss of an optical-waveguide-type optical module including the optical waveguide structure, and fluctuation of the insertion loss of the optical-waveguide-type optical module including the optical waveguide structure when an environmental temperature is changed.

As long as the thickness of cladding at the input port can be brought closer to the thickness of cladding at the output port, the non-aligned groove may be arranged on one side or both sides of the opposite sides of the input groove (the second aligned groove). Further, the non-aligned groove may be arranged laterally each other to define a non-aligned groove array. The non-aligned grooves may have any shapes and dimensions.

For example, in another conventional optical waveguide structure (a pitch converter) where a pitch of output ports (second port and other ports) is greater than that of input ports (first port and other ports), the same number of output grooves (second grooves, etc) are provided as that of the output ports (second ports), while the same number of input grooves are provided as that of the input ports (first ports). In this case, since the pitches of the input grooves and the output grooves are different from each other, an influence on the input groove from an groove adjacent thereto is different from that on the output groove from an groove adjacent thereto so that a thickness of the cladding at the output port (second port) is different from that of the cladding at the input port (first port). Thus, this is room for reduction in the above-stated insertion loss. In the present invention, by providing the non-aligned groove arranged adjacent to or between the broader-pitch output grooves (first aligned grooves) and located out of alignment with any other ports of the core so that the pitch between these grooves is narrowed, a thickness of the cladding at the output port (second port) can be brought closer to a thickness of the cladding at the input port (first port). Further, by providing grooves (first aligned groove, side groove, second aligned groove and other grooves) more than a total number of the ports which is a sum of numbers of the input ports (first ports) and output ports (second ports), thicknesses of the cladding at the opposed end ports (second port) in the lateral direction can be brought closer to those of the cladding at the other ports (first port). This makes it possible to reduce an insertion loss of an optical-waveguide-type optical module including the optical waveguide structure, as well as to reduce fluctuation of an insertion loss of an optical-waveguide-type optical module including the optical waveguide structure when an environmental temperature is changed.

As long as the a thickness of the cladding at the output port can be brought closer to that of the cladding at the input port, a plurality of such non-aligned grooves arranged laterally relative to each other may define a non-aligned groove array. The non-aligned groove may have any suitable shape and dimensions.

In a conventional pitch converter, regarding each of input grooves at the laterally opposed ends (second groove), it is affected by a groove adjacent thereto provided only on one side thereof. On the other hand, the other input grooves (first grooves) are affected by grooves adjacent thereto provided on the opposite sides thereof. Thus, thicknesses of the cladding at the laterally opposed end ports (second ports) are different from those of the cladding at the other input ports (first ports) so that there is room for reduction in the above-stated insertion loss. In the present invention, by providing a non-aligned groove arranged laterally adjacent to each of the grooves at the laterally opposed ends on the other side thereof and located out of alignment with any ports, thicknesses of the cladding at the laterally opposed end ports (second ports) can be brought closer to those of the cladding at the other input ports (first ports). This makes it possible to reduce an insertion loss of an optical-waveguide-type optical module including the optical waveguide structure, as well as to reduce fluctuation of an insertion loss of an optical-waveguide-type optical module including the optical waveguide structure when an environmental temperature is changed.

As long as the thicknesses of the cladding at the laterally opposed end ports can be brought closer to those of the cladding at the other input ports, a plurality of such non-aligned grooves arranged laterally relative to each other may define a non-aligned groove array. The non-aligned groove may have any suitable shape and dimensions.

In order to achieve the second object, an optical waveguide structure according to the third aspect of the present invention is an optical waveguide structure which is a component of an optical-waveguide-type optical module comprising a substrate having a support portion for supporting an optical fiber extending longitudinally; and an optical waveguide layered on the substrate adjacent to the support portion of the substrate and having a core for transmitting light between the optical fiber supported by the support portion and the core of the optical waveguide; wherein the support portion has an upper surface with a lateral width, and an aligned groove formed in the upper surface for supporting the optical fiber and aligned longitudinally with the core of the optical waveguide, the aligned groove being located on a centerline relative to the lateral width or on one lateral side of the centerline; and wherein the support portion further has at least one non-aligned groove formed in the upper surface out of alignment with the core of the optical waveguide and located on the centerline or on the other lateral side of the centerline, the non-aligned groove having the same cross-sectional shape as that of the aligned groove.

In this optical waveguide structure, when an optical fiber is supported on the aligned groove formed in the upper surface of the support potion of the substrate, the optical fiber can be aligned with the core of the optical waveguide to transmit light between the optical fiber and the core of the optical waveguide. Then, a holding member for holding the optical fiber against the support portion is set, and spaces between any two of the support portion, the optical fiber and the holding member are filled with the adhesive to fix the optical fiber to the support portion of the substrate. When an interposition member having the same cross-sectional shape as that of the optical fiber is simultaneously interposed between the holding member and the non-aligned groove formed in the upper surface of the support portion and having the same cross-sectional shape as the aligned groove, the holding member can be fixed to the optical fiber substantially parallel to the upper surface of the substrate. Specifically, the holding member typically has the same width as that of the upper surface of the support portion of the substrate. In this case, a center of gravity of the holding member is located on a centerline relative to the lateral width of the support portion. If the aligned groove in the upper surface of the support portion is located on the centerline or on one side of the centerline, the holding member may be inclined toward the other side of the centerline because the center of gravity of the holding member is located on the centerline. However, since the interposition member is interposed between the holding member and the non-aligned groove on the other side of the centerline, the holding member is prevented from being fixed to the optical fiber in a state inclined toward the other side of the centerline. This makes it possible to uniform respective thicknesses of the adhesive on the opposite sides of the optical fiber so as to equalize stress acting on the optical fiber when an environmental temperature is changed. Thus, the optical waveguide structure of the present invention which is a component of an optical-waveguide-type optical module can reduce fluctuation of insertion loss of the optical-waveguide-type optical module when an environmental temperature is changed.

In this connection, since both of the aligned groove and the non-aligned groove cannot exist on the centerline at the same time, when one of them is located on the centerline, the other thereof is not located on the centerline. The holding member may not have the same width as that of the support portion. Even if the center of gravity of the holding member is not located on the centerline, when the center of gravity of the holding member in an optical waveguide structure is located on the aligned groove or the non-aligned groove or between the aligned and non-aligned grooves, such an optical waveguide structure will fall within the scope of the present invention.

In one embodiment of the present invention, preferably, the aligned groove is located on the centerline and the non-aligned grooves are located on the opposite lateral sides of the aligned groove.

In this optical waveguide structure, when the single aligned groove is located on the centerline, since the center of gravity of the holding member is typically located on the centerline, the holding member may be inclined toward either one of the opposite sides of the centerline. However, when the interposition members are interposed between the holding member and the non-aligned grooves formed on the opposite sides of the centerline, the holding member can be prevented from being fixed to the optical fiber in a state inclined toward one side of the centerline. This makes it possible to reduce fluctuation of insertion loss of the optical-waveguide-type optical module when an environmental temperature is changed, as mentioned above.

In order to achieve the second object, an optical-waveguide-type optical module according to the third aspect of the present invention is an optical-waveguide-type optical module comprising a substrate having a support portion for supporting an optical fiber extending longitudinally; an optical fiber supported on the support portion; an optical waveguide layered on the substrate adjacent to the support portion of the substrate and having a core for transmitting light between the optical fiber supported by the support portion and the core of the optical waveguide; a holding member holding the optical fiber against the support portion of the substrate; and an adhesive filled in a space between any two of the support portion, the optical fiber and the holding member to fix the optical fiber to the support portion; wherein the support portion has an upper surface and a support groove formed in the upper surface for supporting the optical fiber and aligned longitudinally with the core of the optical waveguide, the support groove being located on a centerline extending longitudinally through a center of gravity of the holding member or on one lateral side of the centerline; and wherein the support portion further has at least one non-support groove formed in the upper surface out of alignment with the core of the optical waveguide and located on the centerline or on the other lateral side of the centerline, the non-support groove having the same cross-sectional shape as that of the support groove; and the optical-waveguide-type optical module further comprising at least one interposition member interposed between the non-support groove and the holding member, the interposition member having the same cross-sectional shape as that of the optical fiber.

In this optical-waveguide-type optical module of the present invention (the former), the same effects as that of the previously-explained optical waveguide structure (the latter) can be obtained because the former is similar to the latter except that the aligned and non-aligned grooves of the latter are replaced with the support and non-support grooves of the former. Thus, this optical-waveguide-type optical module of the present invention can reduce fluctuation of insertion loss thereof when an environmental temperature is changed.

In order to achieve the third object, an optical fiber array according to the third aspect of the present invention is an optical fiber array configured to be coupled to an optical fiber to form an optical module, comprises a support substrate for supporting an optical fiber extending longitudinally; an optical fiber supported by the support substrate; a holding member holding the optical fiber against the support substrate; and an adhesive filled in a space between any two of the support substrate, the optical fiber and the holding member to fix the optical fiber to the support substrate; wherein the support substrate has an upper surface and a support groove formed in the upper surface for supporting the optical fiber and aligned longitudinally with the core of the optical waveguide, the support groove is located on a centerline extending longitudinally through a center of gravity of the holding member or on one lateral side of the centerline; and wherein the support substrate further has at least one a non-support groove formed in the upper surface out of alignment with the core of the optical waveguide and located on the centerline or on the other lateral side of the centerline, the non-support groove having the same cross-sectional shape as that of the support groove; and the optical fiber array further comprises at least one interposition member interposed between the non-support groove and the holding member, the interposition member having the same cross-sectional shape as that of the optical fiber.

In this optical fiber array of the present invention (the former), the same effects as that of the explained optical waveguide structure (the latter) can be obtained because the former is similar to the latter except that the support portion of the substrate and the aligned and non-aligned grooves of the latter are respectively replaced with the support substrate and the support and non-support grooves of the former. Thus, this optical fiber array of the present invention configured to be coupled to an optical fiber to form an optical module can reduce fluctuation of insertion loss thereof when an environmental temperature is changed.

In order to achieve the second object, an optical waveguide structure according to the third aspect of the present invention is an optical waveguide structure which is a component of an optical-waveguide-type optical module comprises a substrate having a support portion for supporting an optical fiber extending longitudinally; and an optical waveguide layered on the substrate adjacent to the support portion of the substrate and having a core for transmitting light between the optical fiber supported by the support portion and the core of the optical waveguide; wherein the support portion has an upper surface with a lateral width and a first region which includes a plurality of aligned grooves formed in the upper surface for supporting the optical fibers and aligned with the core of the optical waveguide longitudinally, a centerline relative to the lateral width, and second regions arranged on the opposite sides of the first region, each second region including a non-aligned groove formed in the upper surface out of alignment with the core of the optical waveguide and having the same cross-sectional shape as that of the aligned groove.

In this optical waveguide structure, when a holding member for holding the optical fiber against the support portion is set, and spaces between any two of the support portion, the optical fiber and the holding member are filled with the adhesive to fix the optical fiber to the support portion of the substrate, the holding member can be fixed to the optical fiber substantially parallel to the upper surface of the substrate. In this connection, the holding member may be slightly inclined relative to the upper surface of the substrate due to the presence of the second regions. However, when an interposition member having the same cross-sectional shape as that of the optical fiber is interposed in the second regions between the holding member and the non-aligned groove formed in the upper surface of the support portion and having the same cross-sectional shape as the aligned groove, the holding member can be maintained substantially parallel to the upper surface of the substrate.

As mentioned above, the optical waveguide structure according to the present invention can reduce an insertion loss of an optical-waveguide-type optical module including the optical waveguide structure as compared with the conventional optical-waveguide-type optical module. The optical-waveguide-type optical module itself according to the present invention can also reduce an insertion loss thereof as compared with the conventional optical-waveguide-type optical module.

The optical waveguide structure according to the present invention can reduce fluctuation of an insertion loss of an optical-waveguide-type optical module including the optical waveguide structure when an environmental temperature is changed. The optical-waveguide-type optical module itself according to the present invention can also reduce fluctuation of an insertion loss thereof when an environmental temperature is changed.

Further, according to the present invention, a production lead-time of an optical waveguide substrate can be reduced. Conventionally, an arrangement of grooves such as V-shaped grooves for mounting optical fibers in a substrate of an optical waveguide structure is necessary to be changed depending on patterns and layouts of optical waveguides therein. Therefore, when a new type of an optical waveguide structure is produced, after patterns and layouts of optical waveguides are completely determined, it is necessary to design a new arrangement of V-shaped grooves, prepare a photo mask therefore, and produce a new substrate formed with the V-shaped grooves. Thus, a production lead-time of the optical waveguide structure becomes long. In the present invention, a common substrate which is previously produced with V-shaped grooves can be used to allow desired optical waveguides to be formed at any locations. Therefore, when a new or revised optical waveguide structure is produced, only a photo mask therefore is necessary, that is, designing a new arrangement of the V-shaped grooves is omitted. Thus, a production lead time and a delivery period for a new or revised optical waveguide substrate can be shorten.

Further, the optical fiber array according to the present invention configured to be coupled to an optical fiber so as to form an optical module can reduce fluctuation of an insertion loss of the optical module when an environmental temperature is changed.

DETAILED DESCRIPTION OF THE PREFERRED EMBODIMENTS

Figure 1:
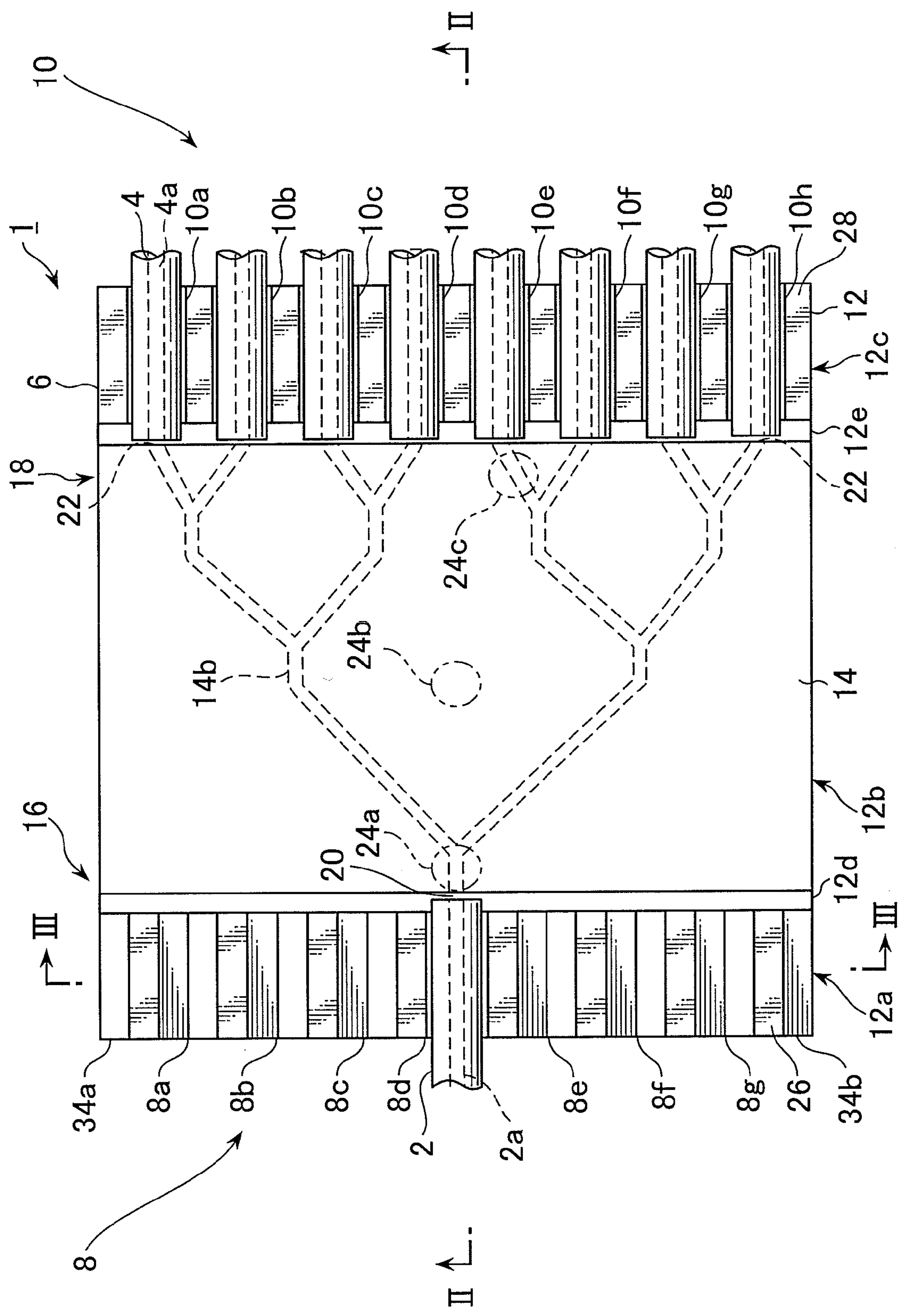
FIG. 1 is a top plan view showing an optical-waveguide-type optical module including an optical waveguide structure according to a first embodiment of the present invention.
Figure 2:
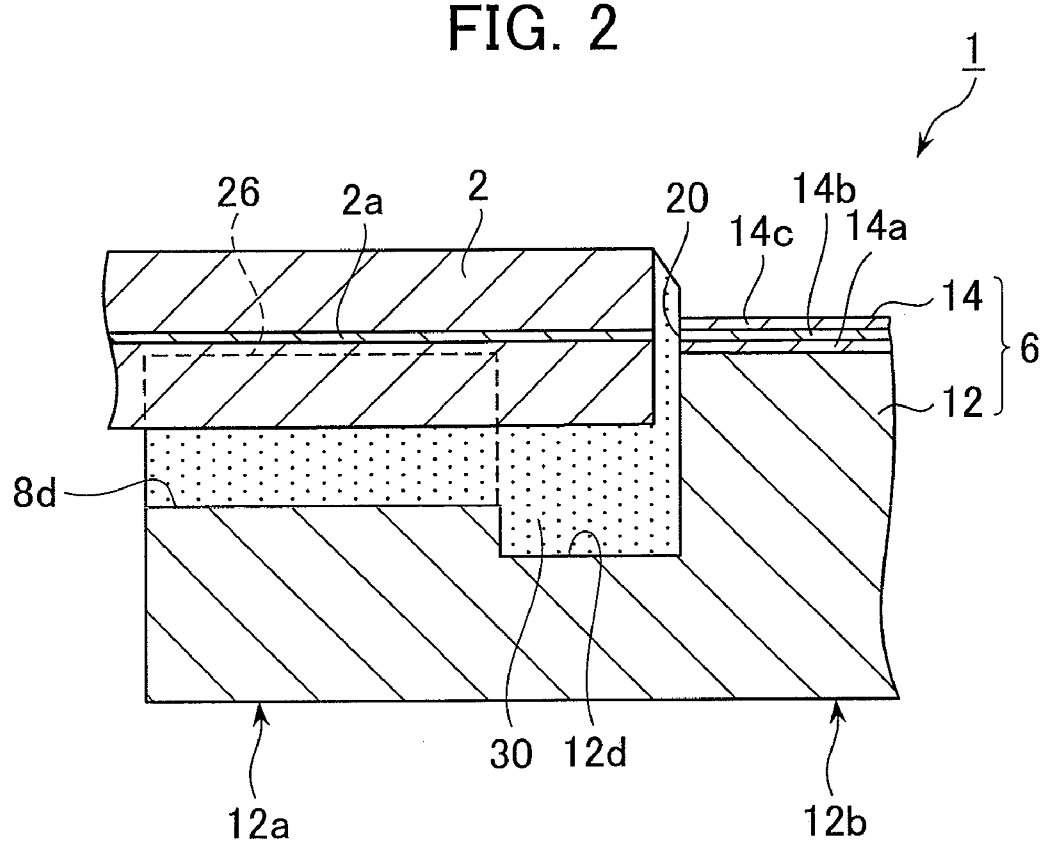
FIG. 2 is a fragmentary enlarged cross-sectional view taken along the line II-II in FIG. 1.
Figure 3:
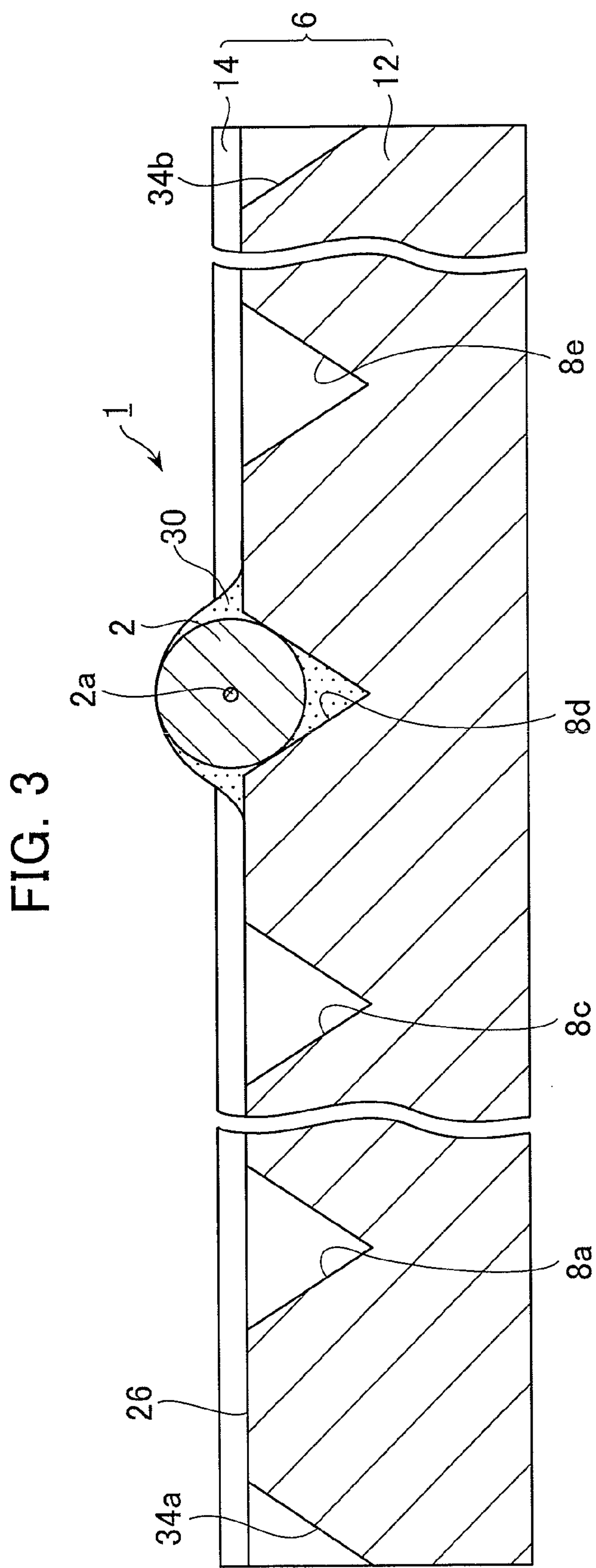
FIG. 3 is a fragmentary enlarged cross-sectional view taken along the line III-III in FIG. 1.

Referring to FIGS. 1-3, an optical waveguide structure according to a first embodiment of the present invention will now be explained in detail.

FIG. 1 is a top plan view showing an optical-waveguide-type optical module including an optical waveguide structure according to the first embodiment of the present invention. FIG. 2 is a fragmentary enlarged sectional view taken along the line II-II in FIG. 1, and FIG. 3 is a fragmentary enlarged sectional view taken along the line III-III in FIG. 1.

As shown in FIGS. 1-3, an optical-waveguide-type optical module 1 has a single upstream optical fiber 2 extending longitudinally, eight downstream optical fibers 4 extending longitudinally, spaced longitudinally from the upstream optical fiber 2 and arranged laterally relative to each other, and an optical waveguide structure 6 for transmitting light from the upstream optical fiber 2 to the downstream optical fibers 4, which structure 6 is the first embodiment of the present invention. The upstream optical fiber 2 and the downstream optical fibers 4 include respective cores 2*a*, 4*a* extending longitudinally. Each of the optical fibers has a diameter of, for example, 125 μm.

The optical waveguide structure 6 has a substrate 12 formed with an upstream groove array 8 of grooves 8*a*-8*g* extending longitudinally and arranged laterally relative to each other, and a downstream groove array 10 of grooves 10*a*-10*h* extending longitudinally and arranged laterally relative to each other, the upstream and downstream groove arrays 8, 10 being longitudinally spaced from each other. The optical waveguide structure 6 also has an optical waveguide 14 mounted on the substrate 12 between the upstream groove array 8 and the downstream groove array 10. As explained in detail later, the upstream optical fiber 2 is positioned on a groove 8*d* of the upstream groove array 8, and the eight downstream optical fibers 4 are positioned on respective grooves 10*a*-10*h* of the downstream groove array 10.

The optical waveguide 14 includes an upstream end 16 adjacent to and spaced from the upstream groove array 8, and a downstream end 18 adjacent to and spaced from the downstream groove array 18.

Further, the optical waveguide 14 includes a lower cladding 14*a* layered on the substrate 12, a core 14*b* layered on the lower cladding 14*a* for transmitting light between the upstream optical fiber 2 and the downstream optical fibers 4, and an upper cladding 14*c* layered on the lower cladding 14*a* and the core 14*b*. The core 14*b* of the optical waveguide 14 is formed so that, when the upstream optical fiber 2 and the downstream optical fibers 4 are respectively supported and positioned on the groove 8*d* of the upstream groove array 8 and the grooves 10*a*-10*b* of the downstream groove array 10, the core 14*b* is aligned with the cores 2*a*, 4*a* of the optical fibers 2, 4 at the same level in an vertical direction. The lower cladding 14*a*, the core 14*b* and the upper cladding 14*c* are, for example, made of fluorinated polyimide.

Further, in order to transmit light between the optical fiber 2 positioned on the groove 8*d* of the upstream groove array 8 and the optical fibers 4 positioned on the grooves 10*a*-10*b* of the downstream groove array 10, the core 14*b* of the optical waveguide 14 has one upstream port 20 aligned with the groove 8*d* of the upstream groove array 8, and eight downstream ports 22 aligned with the respective downstream grooves 10*a*-10*b*, number of the downstream ports 22 being greater than that of the upstream ports 20. In the illustrated optical waveguide structure 6, the core 14*b* of the optical waveguide 14 extends from the single upstream port 20, is branched toward a downstream side, and terminates at the eight downstream ports 22. The optical waveguide 14 has an upstream portion 24*a* adjacent to the upstream port 20, an intermediate portion 24*b* between the upstream port 20 and the downstream ports 22, and a downstream portion 24*c* adjacent to one of the downstream ports 222.

The substrate 12 has an upstream portion 12*a* for supporting the upstream optical fiber 2, a central portion 12*b* on which the optical waveguide 6 is mounted, and a downstream portion 12*c* for supporting the downstream optical fibers 4. The substrate 12 also has an upstream recessed portion 12*d* between the upstream portion 12*a* and the central portion 12*b*, and a downstream recessed portion 12*e* between the central portion 12*b* and the downstream portion 12*c*, the recessed portions 12*d*, 12*e* opening upward and laterally. The substrate 12 is, for example, made of silicon.

The upstream portion 12*a* has an upper surface 26 in which the upstream groove array 8 is arranged. Similarly, the downstream portion 12*c* has an upper surface 28 in which the downstream groove array 10 is arranged. The upstream grooves 8*a*-8*g* adjacent to each other and the downstream grooves 10*a*-10*h* adjacent to each other respectively extend over the longitudinal lengths of the upper surface 26 of the upstream portion 12*a* and the upper surface 28 of the downstream portion 12*c* of the substrate 12. Each of the upstream grooves 8*a*-8*g* and the downstream grooves 10*a*-10*h* has a cross-sectional shape capable of supporting and positioning the optical fiber. In this embodiment, such a cross section is a V-shaped cross section. When such a V-shaped cross-sectional groove is made by means of a silicon anisotropic etching process based on an etching anisotropy property of silicon due to a crystal orientation thereof, the V-shaped cross sectional groove can be processed with a high degree of accuracy so that a fluctuation of a depth of the V-shaped cross-sectional groove relative to a level of the core of the optical waveguide can be reduced, which allows an advantage of the present invention to be enjoyed effectively.

The upstream optical fiber 2 is supported and positioned on the upstream groove 8*d* so that the fiber 2 protrudes above the upstream recessed portion 12*d* and is disposed close to the upstream end 16 of the optical waveguide 14. Similarly, the eight downstream optical fibers 4 are supported and positioned on the respective downstream grooves 10*a*-10*h* so that the fibers 4 protrude above the downstream recessed portion 12*e* and are disposed close to the downstream end 18 of the optical waveguide 14. The upstream optical fiber 2 and the downstream optical fibers 4 are fixed to the substrate 12 and the optical waveguide 14 by means of an adhesive 30. The adhesive 30 is, for example, an UV curing type adhesive.

The grooves 10*a*-10*h* of the downstream groove array 10 are disposed over the entire lateral length or width of the optical waveguide structure 4 at even intervals.

In the upstream groove array 8, the groove 8*d* is disposed at a lateral center of the upstream portion 12*a* of the substrate 12 and aligned with the upstream port 20, and the two grooves 8*c*, 8*e* are disposed on opposite sides of the groove 8*d*, i.e., each thereof is disposed adjacent to the groove 8*d* on a laterally outward side thereof. Further, the grooves 8*b*, 8*a* are disposed on a laterally outward side of the groove 8*c*, and the grooves 8*f*, 8*g* are disposed on a laterally outward side of the groove 8*e*. The grooves 8*a*-8*c* and 8*e*-8*g* other than the groove 8*d* are shifted laterally from the upstream port 20, i.e., misaligned therewith. In this manner, the grooves 8*a*-8*g* of the upstream groove array 8 are disposed over the entire width of the optical waveguide structure 4 at even intervals. Each interval of the grooves 8*a*-8*g* of the upstream groove array 8 is the same as that of the grooves 10*a*-10*b* of the downstream groove array 10. Further, the grooves 8*a*-8*g* of the upstream groove array 8 are disposed out of alignment with the grooves 10*a*-10*h* of the downstream groove array 10 laterally and the former grooves 8*a*-8*g* and the latter grooves 10*a*-10*b* are laterally alternately arranged.

The upstream portion 12*a* also has two half-grooves 34*a*, 34*b* disposed respectively on respective laterally outward sides of the laterally outermost grooves 8*a*, 8*g* at the same interval as that of the grooves 8*a*-8*g* of the upstream groove array 8.

In this embodiment, numbers of the grooves of the upstream groove array 8 and the downstream groove array 10 are respectively seven and eight, while numbers of the upstream ports 20 and the downstream ports 22 are respectively one and eight. In this connection, a ratio of the number of the grooves of the downstream groove array 10 relative to the number of the grooves of the upstream groove array 8 is 8/7, while a ratio of the number of the downstream ports 22 relative to the number of the upstream ports 20 is eight. Thus, the former ratio is less than the latter ratio.

An operation of the optical-waveguide-type optical module 1 will now be explained.

Light transmitted through the single upstream optical fiber 2 is transmitted through the upstream port 8 to the optical waveguide 4, branched toward a downstream side, and transmitted through the eight downstream ports 10*a*-10*h* to the eight downstream optical fibers 4. In this case, the optical-waveguide-type optical module 1 serves as an optical splitter. On the contrary, light may be transmitted in the opposite direction from the downstream optical fibers 4 to the upstream optical fiber 2. In this case, the optical-waveguide-type optical module 1 serves as an optical coupler.

Figure 4:
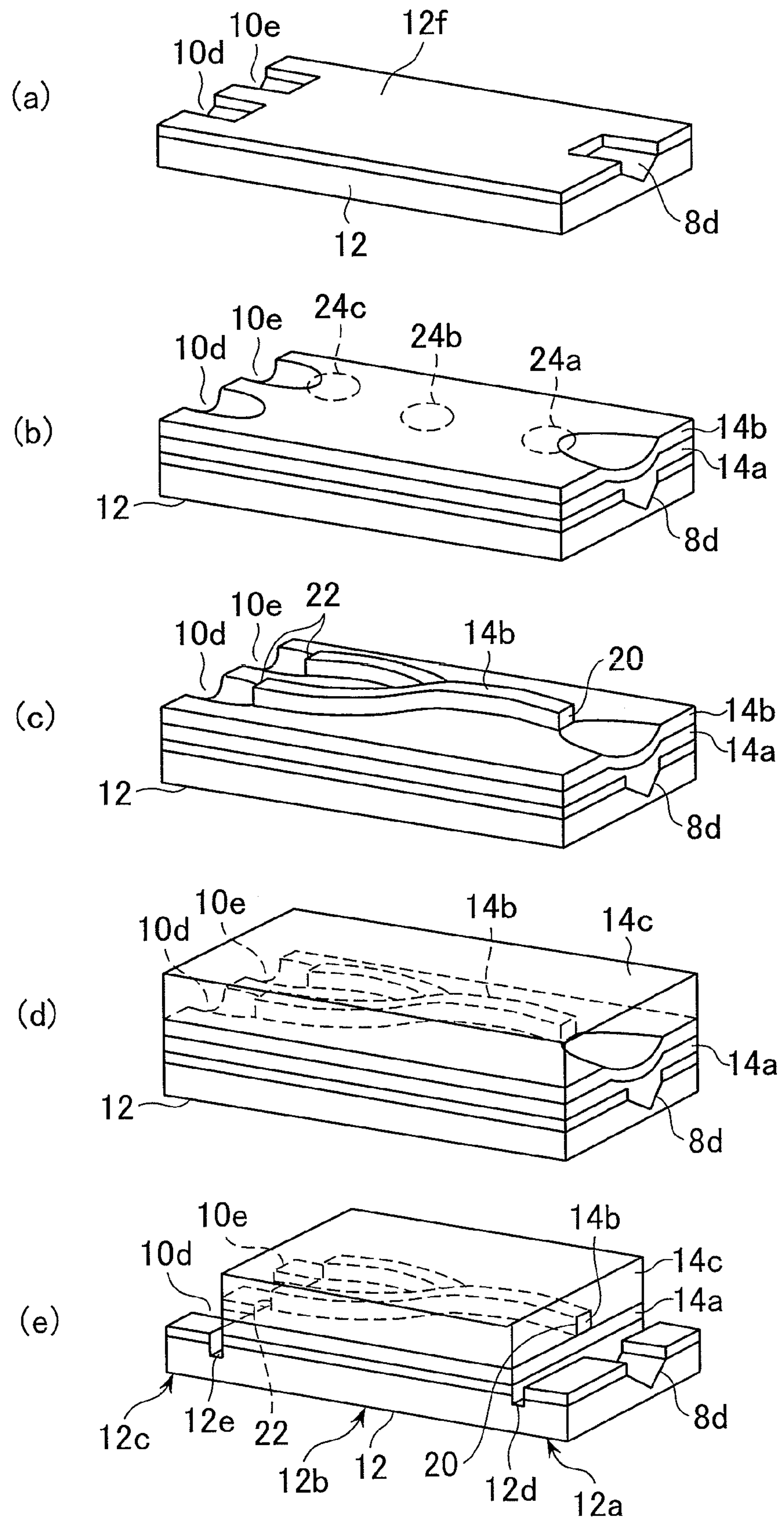
FIG. 4 is an explanatory diagram showing a production process for an optical waveguide structure according to the first embodiment of the present invention.

Next, referring to FIG. 4, one example of a production process for the optical waveguide structure which is the first embodiment of the present invention will be explained. FIG. 4, for simple explanation, shows only a part of the optical waveguide structure 1, specifically, only a portion including the upstream groove 8*d* and two downstream grooves 10*d*, 10*e*. In an actual production process, a plurality of optical waveguide structures 1 are simultaneously formed on a common substrate, and finally cut off individually. Please note that, actually, halves of the grooves 8*c*, 8*e* are located on the opposite sides of the upstream groove 8*d*, and the core 14*b* is branched into the grooves 10*a*, 10*b*, 14*c*, 14*f*, 14*g*, 14*h*, although they are omitted in FIG. 4.

As shown in FIG. 4(*a*), the Si substrate 12 is prepared, and a $SiO_2$ film is formed on the upper surface 12*f* thereof. Then, the substrate 12 is subjected to an anisotropic etching process based on a resist pattern made by means of a photolithographic process so that the V-shaped cross-sectional grooves 8*d*, 10*d*, 10*e* are formed. These V-shaped cross-sectional grooves 8*d*, 10*d*, 10*e* are formed with submicron accuracy relative to the upper surface 12*f*.

Then, as shown in FIG. 4(*b*), the substrate 12 is spin-coated with to form a layer of a lower cladding 14*a*. When the lower cladding 14*a* is formed, the lower cladding 14 at the grooves 8*d*, 10*d*, 10*e* is slightly depressed by intruding them so that the lower cladding therearound is pulled toward the grooves 8*d*, 10*d*, 10*e*. Since the upstream grooves 8*a*-8*c* and 8*e*-8*g* are located on opposite sides of the upstream groove 8*d*, and the downstream grooves 10*a*-10*c* and 10*f*-10*h* are located on the opposite sides of the downstream grooves 10*d*, 10*e*, the lower cladding 14*a* at the upstream portion 24*a* is pulled in the same manner as that at the downstream portion 24*c* is pulled. Thus, thicknesses of the lower cladding 14*a* at the upstream portion 24*a* and the downstream portion 24*c* are substantially equal to each other. On the contrary, a thickness of the lower cladding 14*a* at the intermediate portion 24*b* is different from those of the lower cladding 14*a* at the upstream portion 24*a* and the downstream portion 24*c*.

Subsequently, the substrate 12 is spin-coated with a polymer for a core to form a core 14*b*.

Then, as shown in FIG. 4(*c*), a rectangular-shaped cross-sectional core 14*b* is left by removing therearound for forming paths between the upstream port 20 and the downstream ports 22 by means of processes such as a photolithographic process and a reactive ion etching (RIE) process. Since the thicknesses of the lower cladding 14*a* at the upstream portion 24*a* and the downstream portion 24*c* are substantially equal to each other, positions in the vertical direction of the inlet (upstream) port 20 and the outlet (downstream) ports 22 of the core 14*b* relative to the V-shaped cross-sectional grooves 8*d*, 10*d*, 10*e* are equal to each other with submicron accuracy.

Then, as shown in FIG. 4(*d*), the substrate 12 is spin-coated with a polymer for a cladding to form a layer of an upper cladding 14*c*.

Then, as shown in FIG. 4(*e*), the upstream recessed portion 12*d* and the downstream recessed portion 12*e* are formed by means of a dicing process.

Then, the plurality of optical waveguide structures 1 are cut off individually. The optical fibers 2, 4 are supported and positioned on the grooves of the upstream groove array 8 and the downstream array 10 of the individually-cut optical waveguide structure 1 and fixed to the substrate 12 by means of adhesive 30 (not shown).

Next, referring to FIGS. 5 and 6, two examples of the substrate before the formation of the optical waveguide thereon will be explained. Components shown in FIGS. 5 and 6 corresponding to components shown in FIGS. 1-3 are designated by the same reference numbers as those of the latter components except for adding a symbol ' (dash) or " (double dash).

Figure 5:
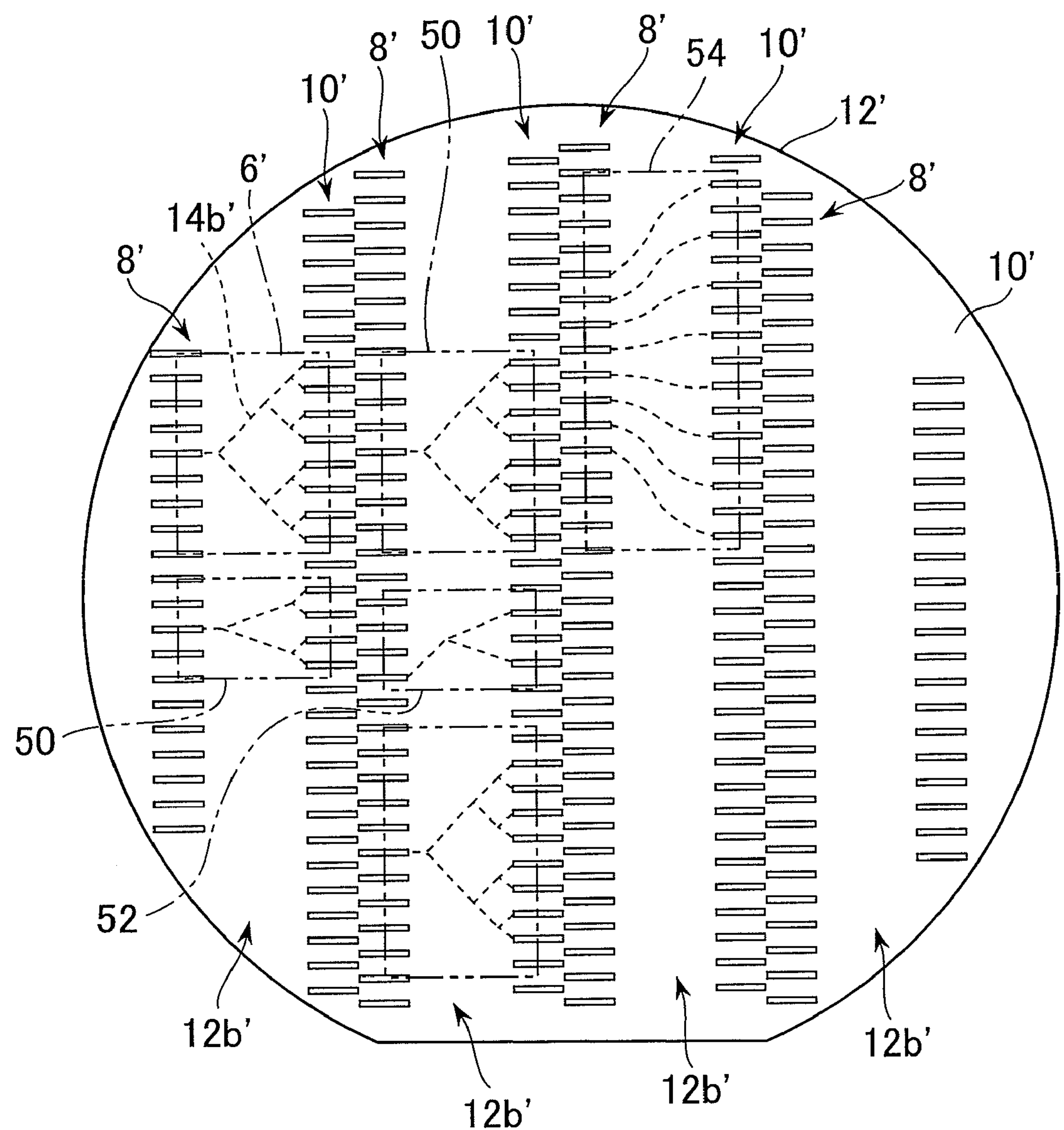
FIG. 5 is a top plan view showing a first example of a substrate in an optical waveguide structure according the present invention before the substrate is formed with an optical waveguide.

FIG. 5 is a top plan view showing a first example of the substrate of an optical waveguide structure according to the present invention before the formation of the optical waveguide on the substrate (corresponding to a state shown in FIG. 4*a*).

A substrate 12' has four upstream arrays 8', four downstream arrays 10', and portions for forming optical waveguides 12*b*' between the upstream arrays 8' and the downstream arrays 10' so as to simultaneously form a plurality of optical waveguide structures 6'. The upstream arrays 8' and the downstream arrays 10' are alternately arranged in a longitudinal direction. Grooves of the upstream arrays 8' and the downstream arrays 10' are disposed at even intervals. The grooves of one of the upstream arrays 8' and the downstream arrays 10' are respectively aligned with the grooves of the other upstream arrays 8' and the downstream arrays in the longitudinal direction. However, the grooves of the upstream arrays 8' are shifted relative to the grooves of the downstream arrays 10' in a lateral direction perpendicular to the longitudinal direction. Specifically, the grooves of the upstream array 8' and the downstream array 10' are alternately arranged in the lateral direction. By mounting cores 14*b*' on the portion 12*b*' for forming the optical waveguides, any types of optical waveguide such as those for an optical splitter, an optical coupler 50, an optical coupling/splitting device 52 and a pitch converter 54 can be arranged in any positions.

Figure 6:
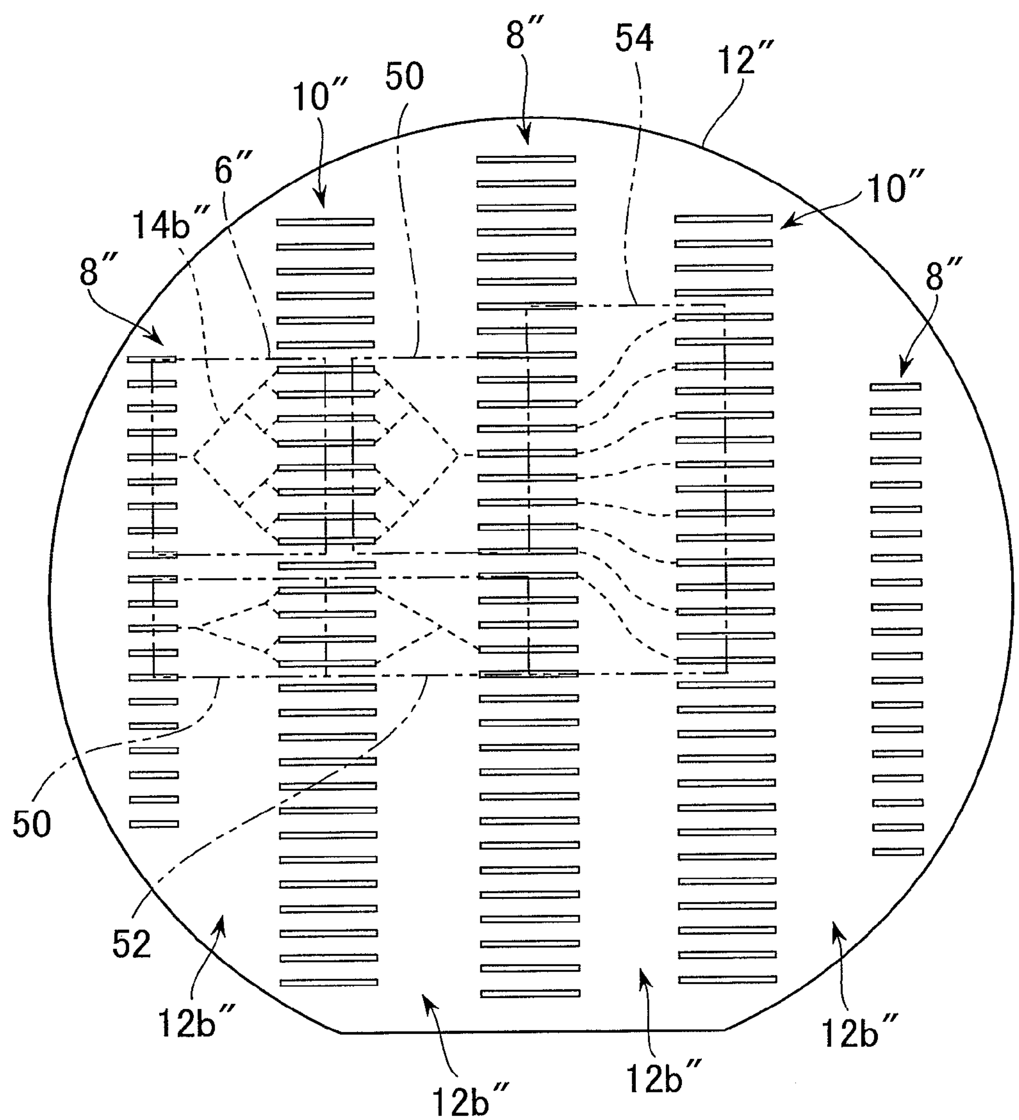
FIG. 6 is a top plan view showing a second example of the substrate in the optical waveguide structure according the present invention before the substrate is formed with an optical waveguide.

FIG. 6 is a top plan view showing a second exanple of the substrate of the optical waveguide structure according to the present invention before the formation of the optical waveguide on the substrate (corresponding to a state shown in FIG. 4*a*).

A substrate 12" has three upstream arrays 8", two downstream arrays 10", and portions for forming for optical waveguides 12*b*" between the upstream arrays 8" and the downstream arrays 10" so as to simultaneously form a plurality of optical waveguide structures 6". The upstream arrays 8" and the downstream arrays 10" are alternately arranged in a longitudinal direction and two of the upstream arrays 8" are located on opposite ends in the longitudinal direction. Longitudinal lengths of the downstream arrays 10" and the upstream array 8' arranged therebetween are double relative to those of the upstream arrays 8' located on the opposite ends. Grooves of the upstream arrays 8" and the downstream arrays 10" are disposed at even intervals. The grooves of one of the upstream arrays 8" and the downstream arrays 10" are respectively aligned with the grooves of the other upstream arrays 8" and the downstream arrays 10" in the longitudinal direction. However, the grooves of the upstream arrays 8" are shifted relative to the grooves of the downstream arrays 10" in a lateral direction perpendicular to the longitudinal direction. Specifically, the grooves of the upstream array 8" and the downstream array 10" are alternately arranged in the lateral direction. By mounting cores 14*b*" on the portion 12*b*" for forming the optical waveguides, any types of optical waveguide such as those for an optical splitter, an optical coupler 50, an optical coupling/splitting device 52 and a pitch converter 54 can be arranged in any positions.

Next, results of measured thickness of the lower cladding 14*a* of the optical waveguide structure 6 which is the first embodiment of the present invention and that of the lower cladding 114*a* in the conventional optical waveguide structure 206 will be explained.

In each of the optical waveguide structure 6 according to the present invention and the conventional optical waveguide structure 106, the interval of the V-shaped cross-sectional grooves 8, 108 was 250 μm, and a polymer for the cladding layer was fluorinated polyimide. The thickness of the lower cladding 14*a*, 114*a* at a measurement point was measured by means of a contact-type film thickness profiler (a needle-contact-type surface profile measuring instrument) on the basis of a portion of the substrate 12 in the vicinity of the measurement point exposed by partly removing the lower cladding on the potion.

In the optical waveguide structure 6 according to the present invention, thicknesses of the lower cladding 14*a* at the upstream portion 24*a*, the intermediate portion 24*b* and the downstream portion 24*c* were measured (see FIG. 1). Differences between the thicknesses of the lower cladding 14*a* at the upstream portion 24*a* and the intermediate portion 24*b* and between the thicknesses thereof at the downstream portion 24*c* and the intermediate portion 24*b* were respectively −0.07 μm and −0.10 μm in average, and 0.13 and 0.08 in standard deviation. Thus, a difference between the thicknesses of the lower cladding 14*a* at the upstream portion 24*a* and the downstream portion 24*c* was 0.03 μm.

Figure 17:
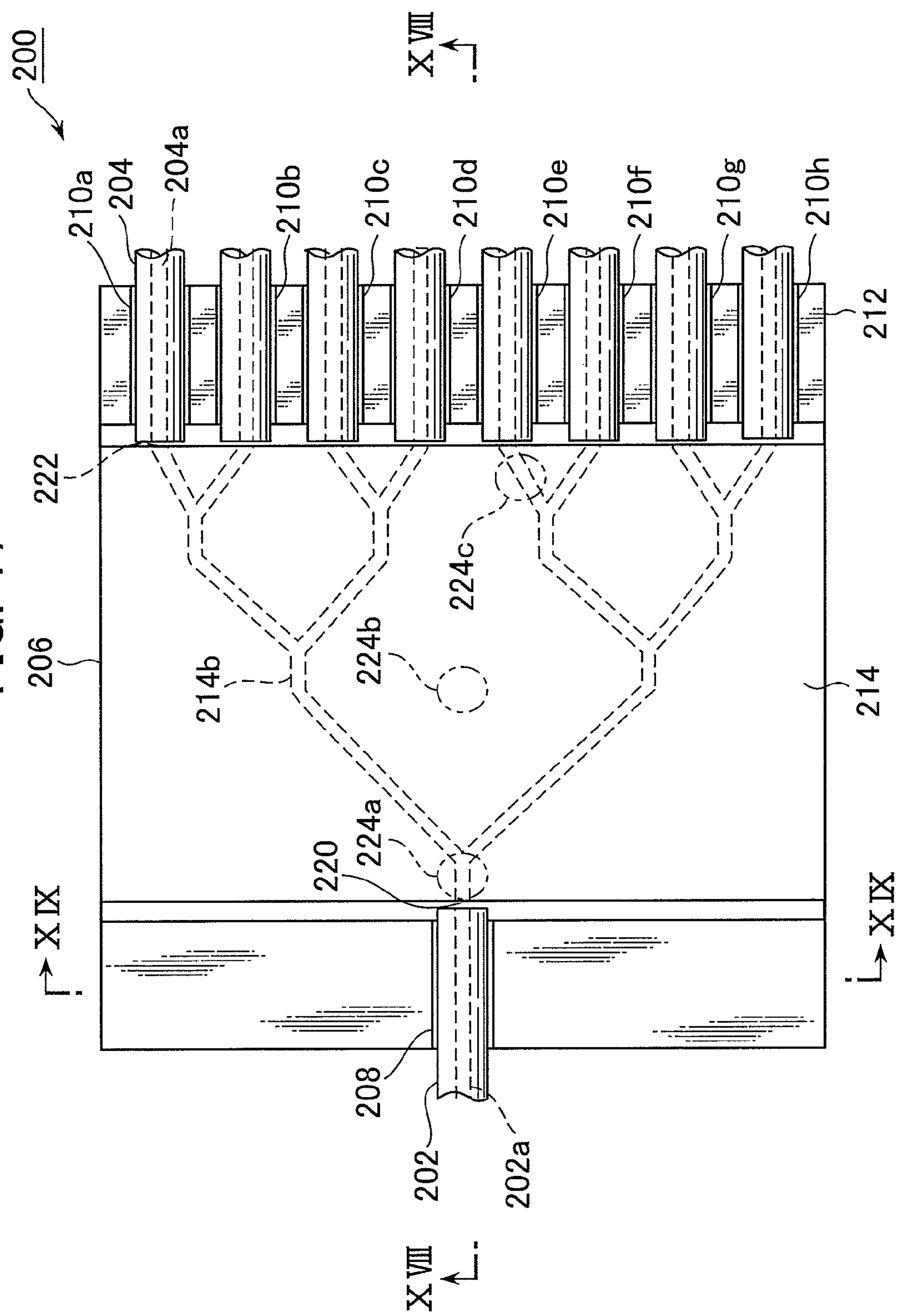
FIG. 17 is a top plan view showing a conventional optical-waveguide-type optical module.
Figure 18:
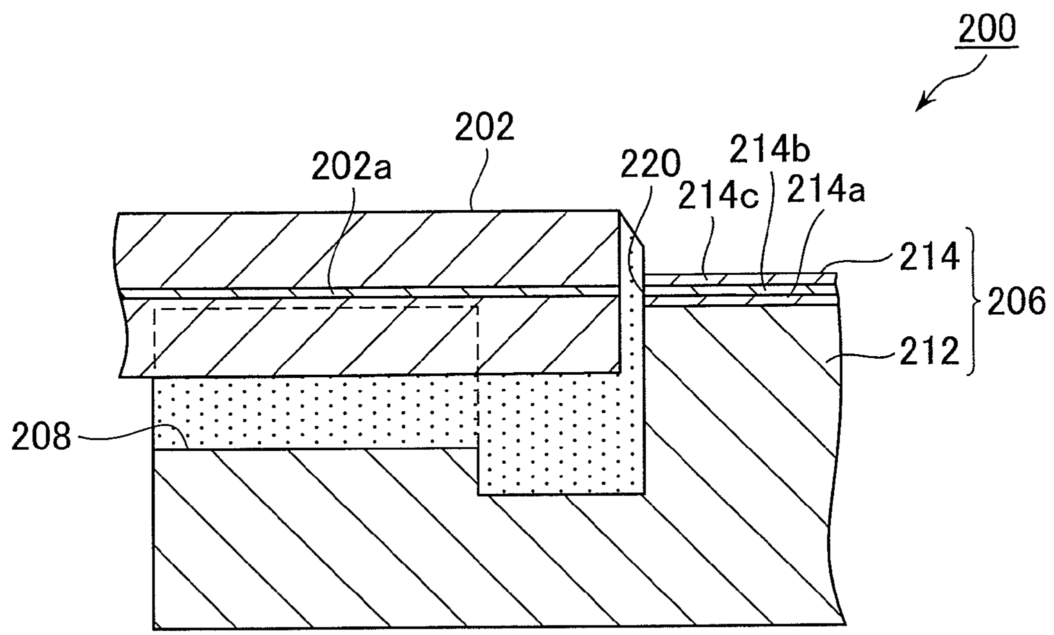
FIG. 18 is a fragmentary enlarged cross-sectional view taken along the line XVIII-XVIII in FIG. 17.
Figure 19:
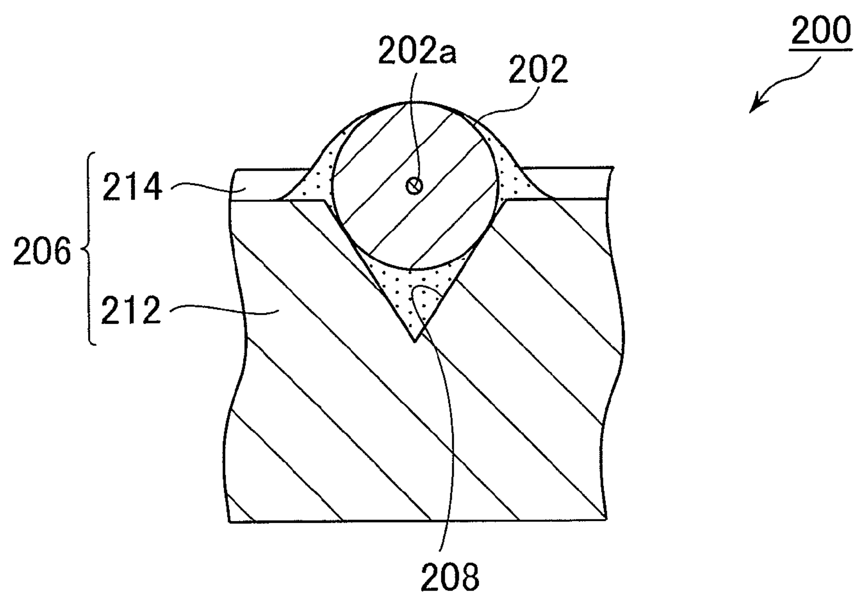
FIG. 19 is an enlarged cross-sectional view taken along the line XIX-XIX in FIG. 17.
Figure 20:
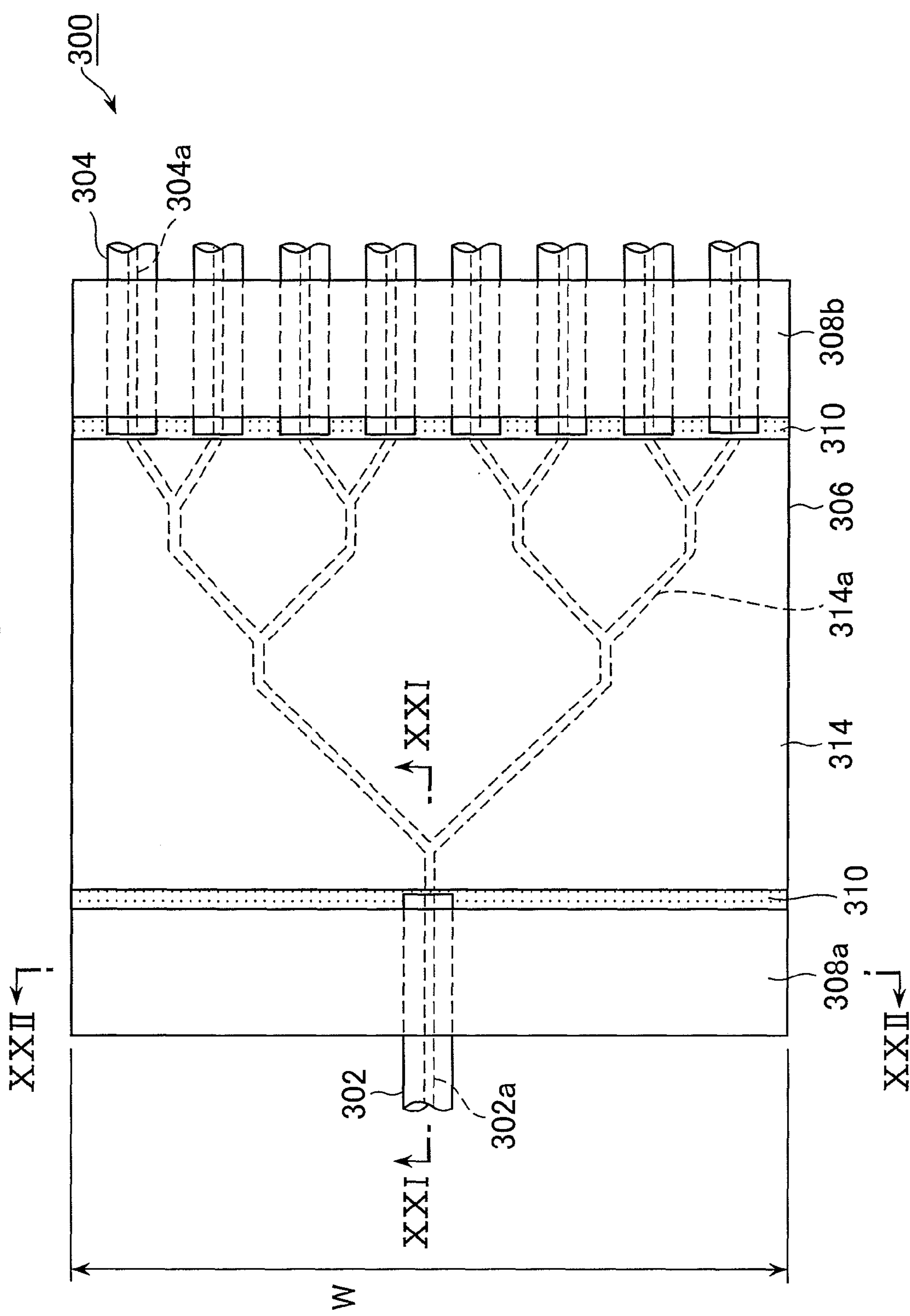
FIG. 20 is a top plan view showing a conventional optical-waveguide-type optical module.
Figure 21:
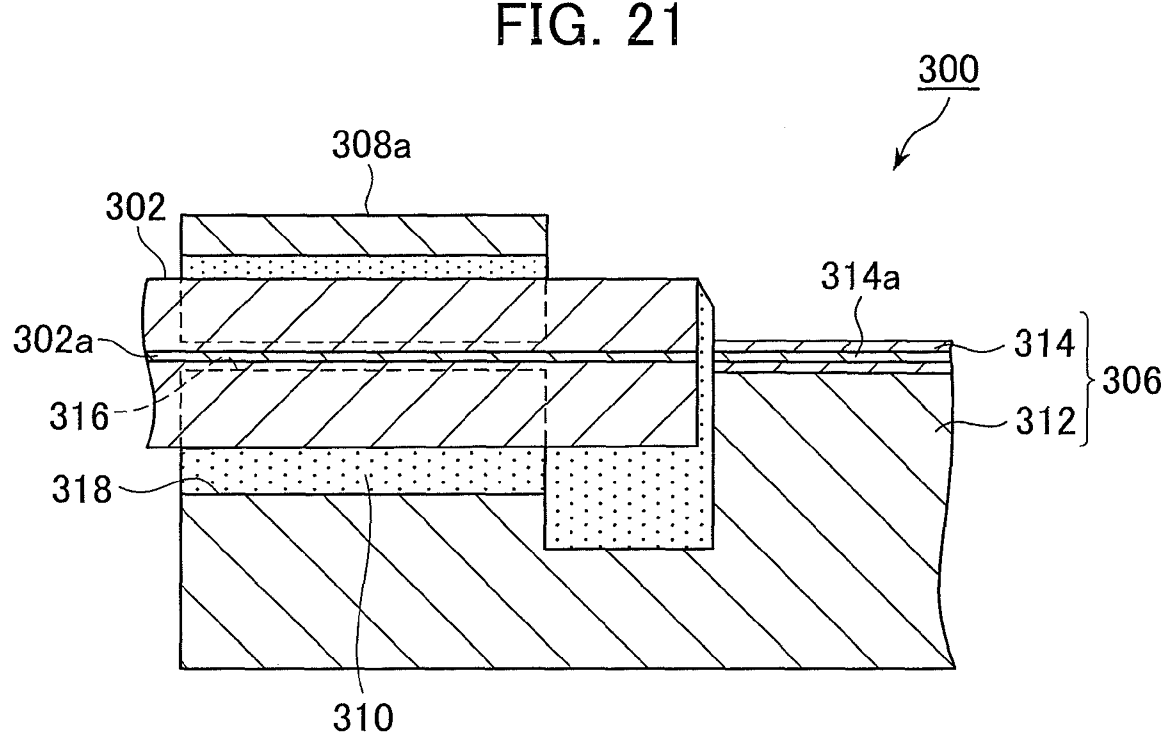
FIG. 21 is a fragmentary enlarged cross-sectional view taken along the line XXI-XXI in FIG. 20.
Figure 22:
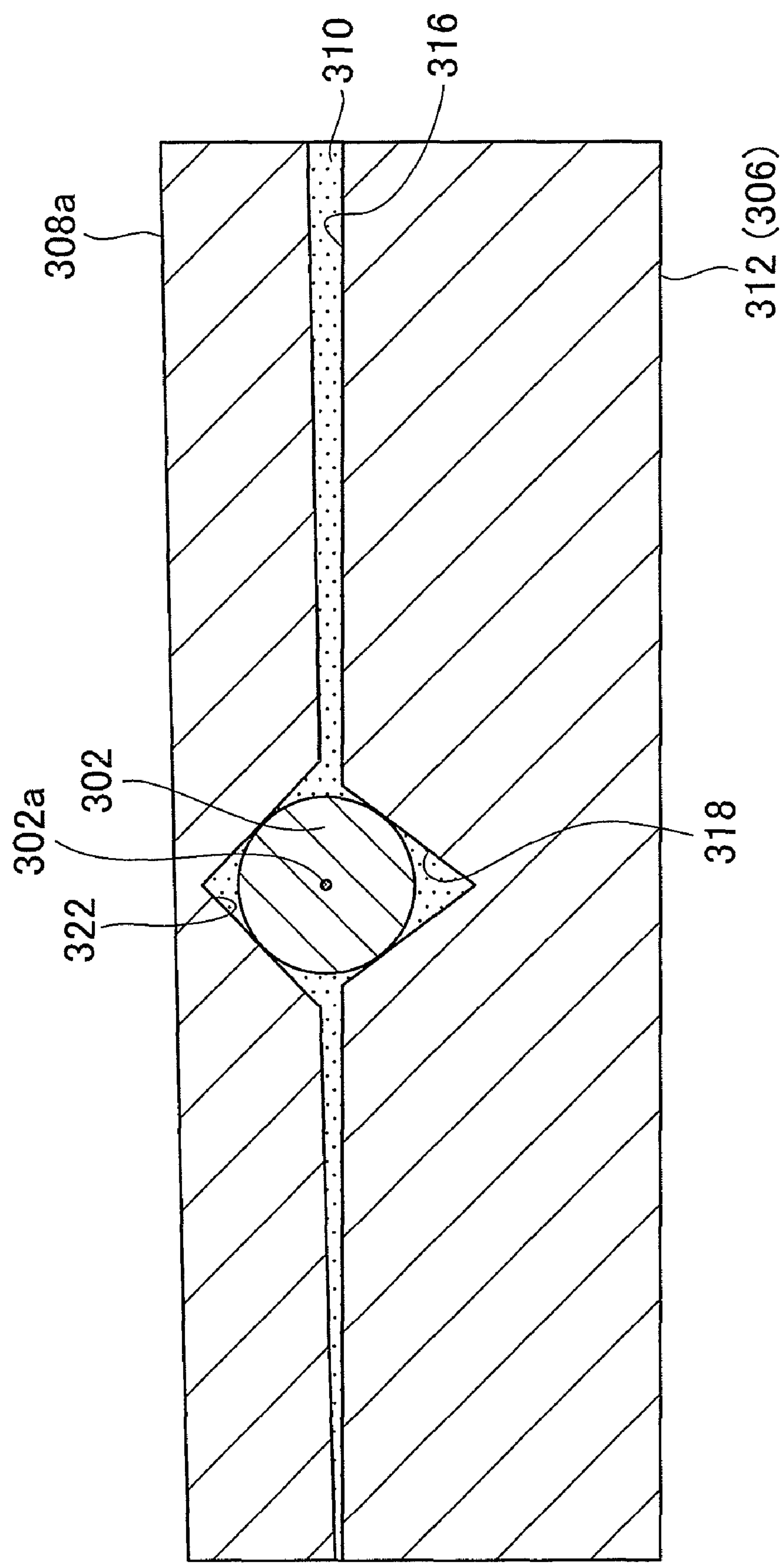
FIG. 22 is an enlarged cross-sectional view taken along the line XXII-XXII in FIG. 20.

In the conventional optical waveguide structure 206, thicknesses of the lower cladding 214*a* at the upstream portion 224*a*, the intermediate portion 224*b* and the downstream portion 224*c* were measured (see FIG. 17). Differences between the thicknesses of the lower cladding 214*a* at the upstream portion 224*a* and the intermediate portion 224*b* and between the thicknesses thereof at the downstream portion 224*c* and the intermediate portion 224*b* were respectively +0.07 μm and −0.06 μm in average, and 0.20 and 0.27 in standard deviation. Thus, a difference between the thicknesses of the lower cladding 214_a_ at the upstream portion 224_a_ and the downstream portion 24_c_ was 0.13 μm.

Comparing the optical waveguide structure 6 according to the present invention with the conventional optical waveguide structure 206, it was confirmed that the values of standard deviation itself of the thicknesses of the lower cladding 14_a_ at the upstream portion 24_a_ and the downstream portion 24_c_ in the former structure 6 is less than that of standard deviation of the thicknesses of the lower cladding 214_a_ at the upstream portion 224_a_ and the downstream portion 224_c_ in the latter structure. Further, it was also confirmed that the difference between the thicknesses of the lower cladding between the upstream portion 24_a_ and the downstream portion 24_c_ in the former structure 6 is less than that of the lower cladding between the upstream portion 224_a_ and the downstream portion 224_c_ in the latter structure 206.

Next, regarding fluctuation of insertion loss of the optical-waveguide-type optical module 1 including the optical waveguide structure 6 which is the first embodiment of the present invention due to changes in an environmental temperature and that of insertion loss of the optical-waveguide-type optical module 300 including the conventional optical waveguide structure 306 due to changes in an environmental temperature, measurement results of these fluctuations will be explained.

Figure 7:
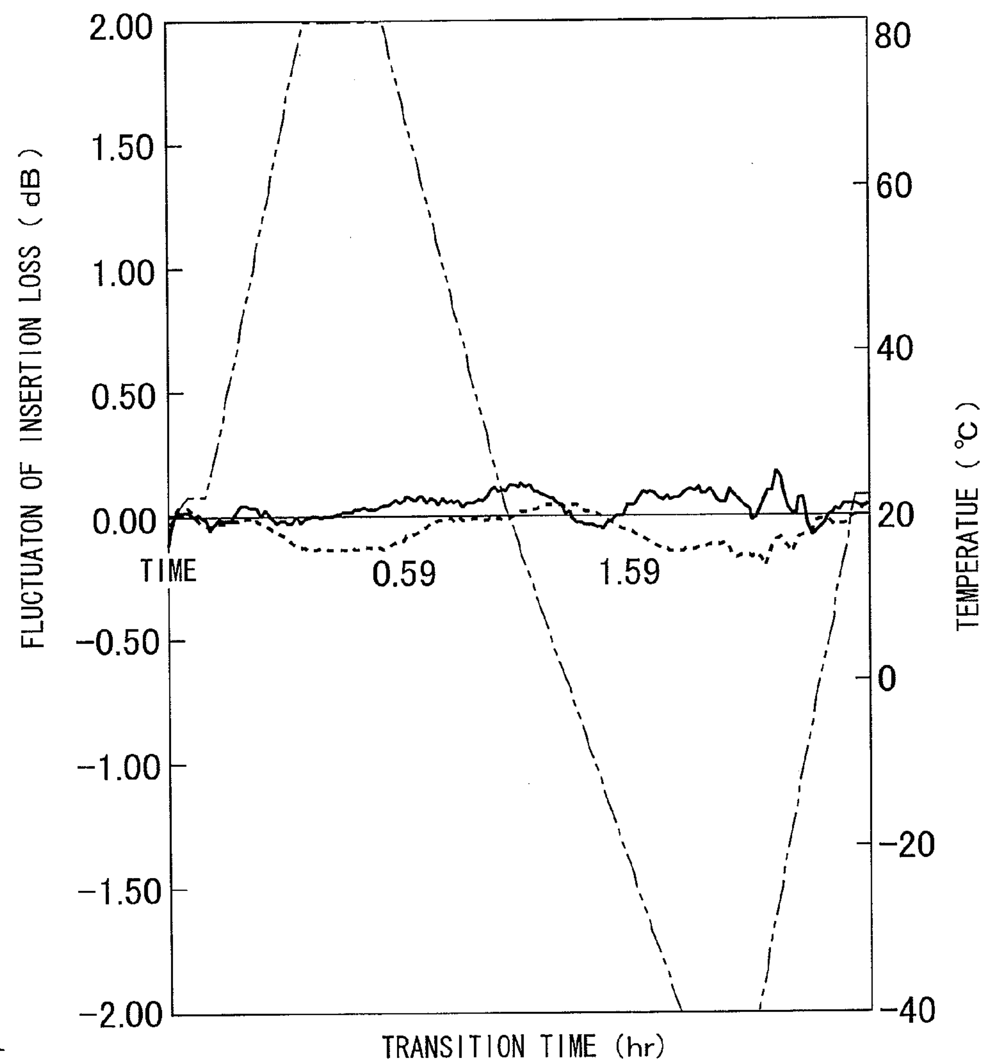
FIG. 7 is a diagram showing fluctuation of an insertion loss of an optical-waveguide-type optical module including an optical waveguide structure according to the first embodiment of the present invention when an environmental temperature is changed.
Figure 8:
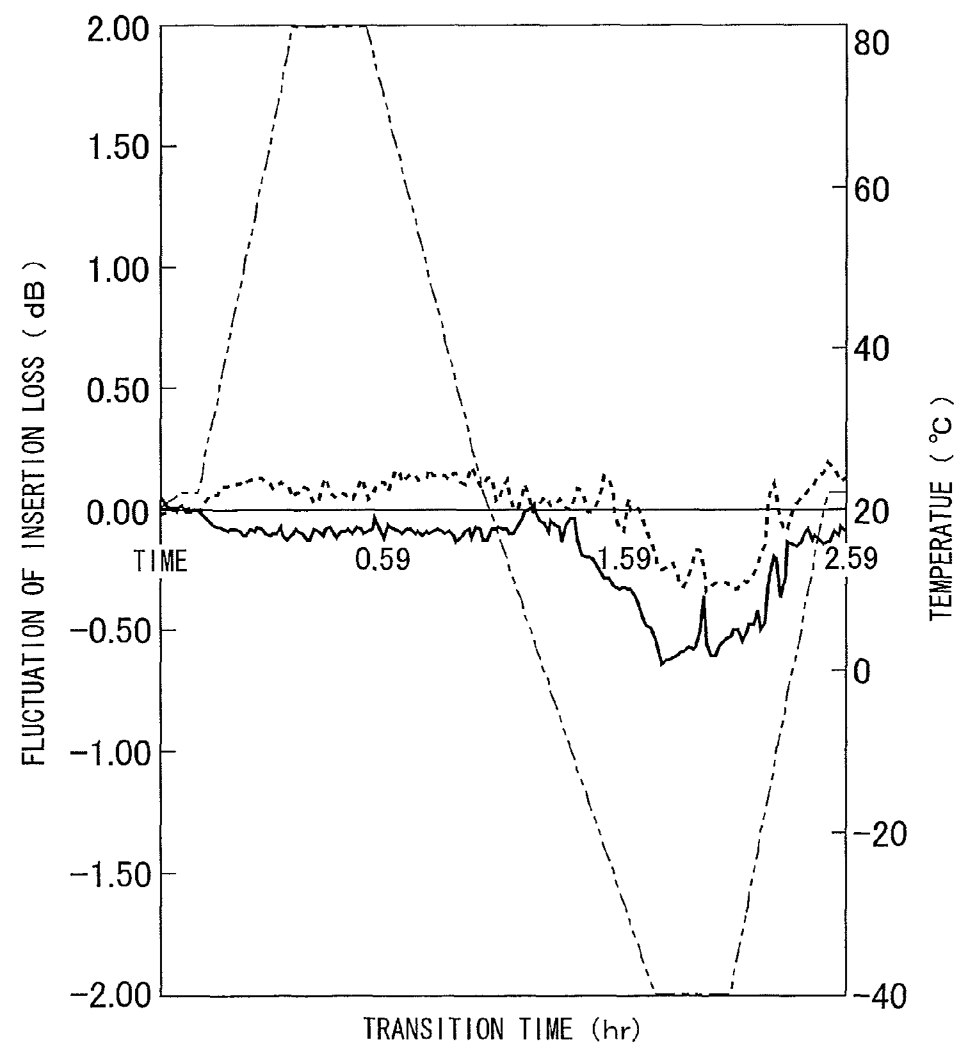
FIG. 8 is a diagram showing fluctuation of an insertion loss of a conventional optical-waveguide-type optical module when an environmental temperature is changed.

FIG. 7 is a graph showing fluctuation of insertion loss of the optical-waveguide-type optical module 1 including the optical waveguide structure 6 according to the present invention during a condition in which an environmental temperature is firstly increased from +25° C. to +85° C., is then decreased to −40° C., and finally increased to +25° C. FIG. 8 is a graph showing fluctuation of insertion loss of the optical-waveguide-type optical module 300 including the conventional optical waveguide structure 306 during the same condition as that shown in FIG. 7.

As can be seen from FIGS. 7 and 8, regarding both of lights having respective wavelengths 1550 nm and 1310 nm, the fluctuation of insertion loss of the optical-waveguide-type optical module 1 including the optical waveguide structure 6 according to the present invention is smaller than that of insertion loss of the optical-waveguide-type optical module 300 including the conventional optical waveguide structure 306 when the environmental temperature was changed in a range between −40° C. and +85° C.

Next, referring to FIGS. 9 to 12, an optical waveguide structure which is a second embodiment of the present invention will be explained.

Figure 9:
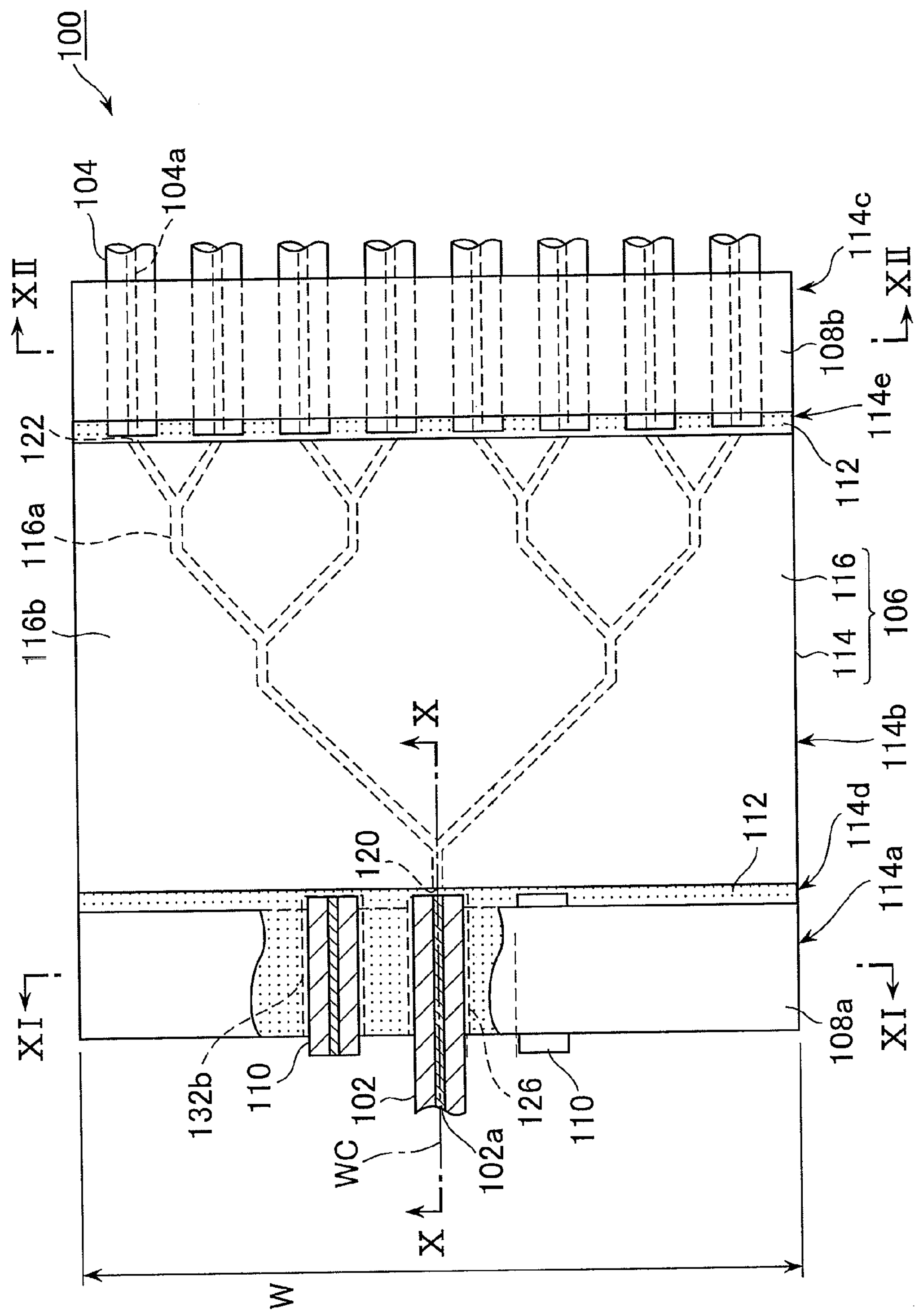
FIG. 9 is a top plan view showing an optical-waveguide-type optical module (splitter) including an optical waveguide structure according to a second embodiment of the present invention.
Figure 10:
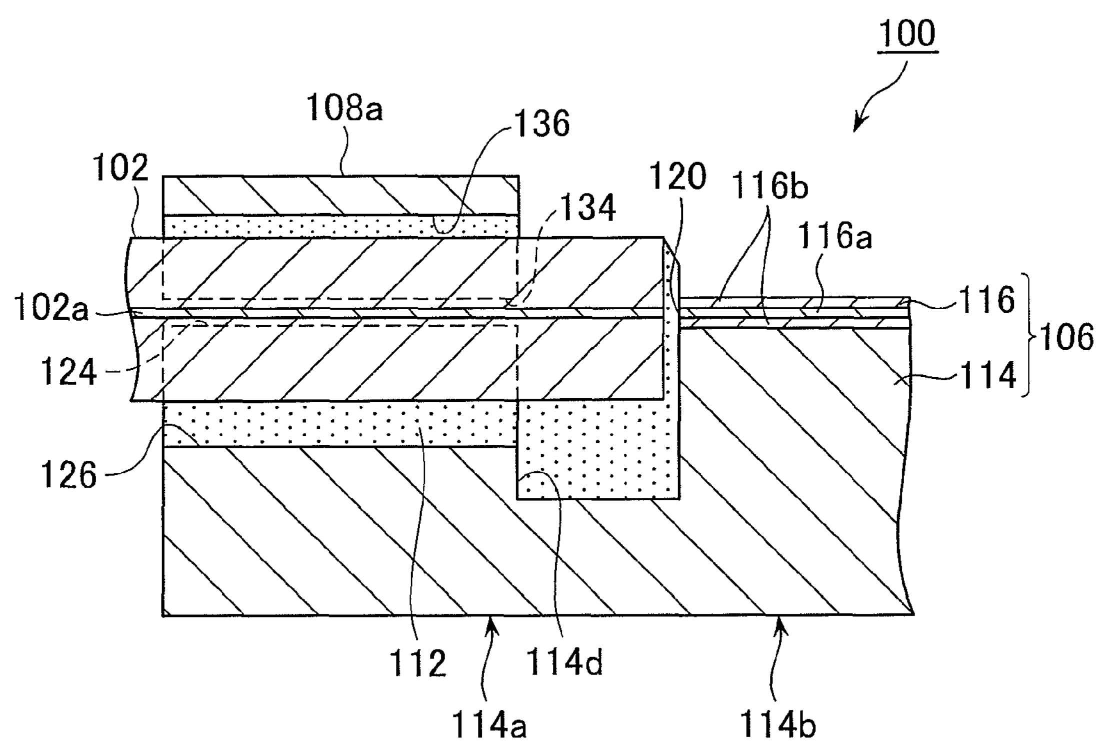
FIG. 10 is a fragmentary enlarged cross-sectional view taken along the line X-X in FIG. 9.
Figure 11:
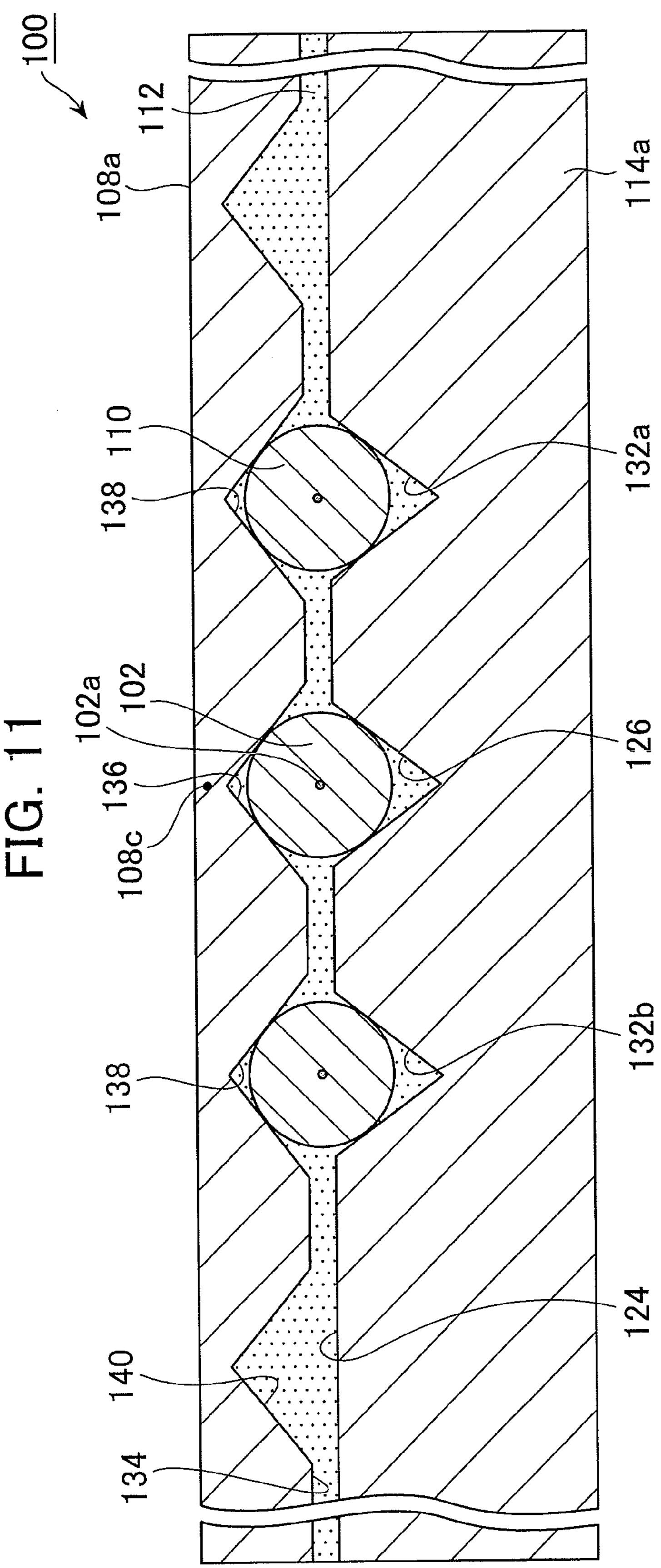
FIG. 11 is a cross-sectional view taken along the line XI-XI in FIG. 9.
Figure 12:
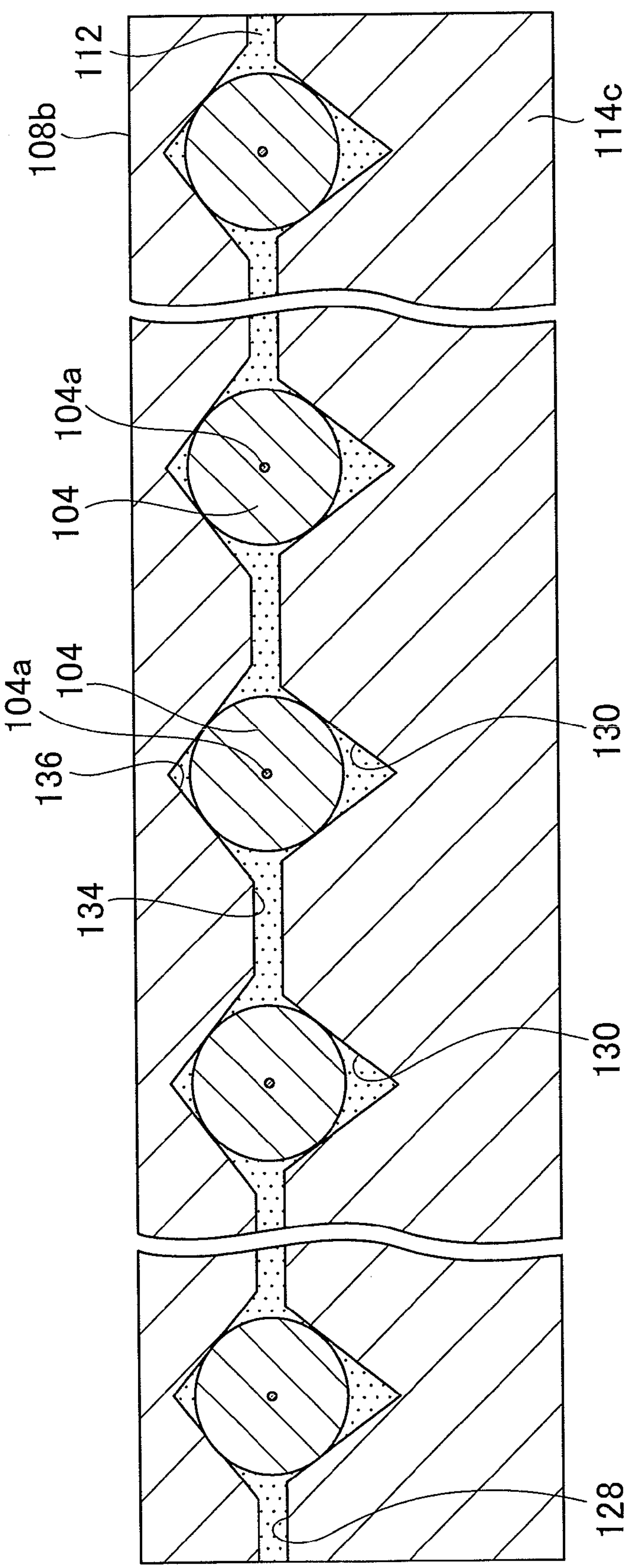
FIG. 12 is a cross-sectional view taken along the line XII-XII in FIG. 9.

FIG. 9 is a top plan view showing an optical-waveguide-type optical module or an optical splitter including an optical waveguide structure which is the second embodiment of the present invention. FIG. 10 is a fragmentary enlarged cross-sectional view taken along the line X-X in FIG. 9. FIG. 11 is an enlarged cross-sectional view taken along the line XI-XI in FIG. 9, and FIG. 12 is an enlarged cross-sectional view taken along the line XII-XII in FIG. 9.

As shown in FIGS. 9-12, an optical-waveguide-type optical module 100 has a single upstream optical fiber 102 extending longitudinally, eight downstream optical fibers 104 extending longitudinally, spaced longitudinally from the upstream optical fiber 102 and arranged laterally relative to each other, and an optical waveguide structure 106 which supports the upstream optical fiber 102 and the downstream optical fibers 104, and allowing light transmitted through the single upstream optical fiber 102 to be transmitted to the eight downstream optical fibers 104. The optical-waveguide-type optical module 100 further has an upstream fiber-holding lid 108_a_ and a downstream fiber-holding lid 108_b_ respectively holding the upstream optical fiber 102 and the downstream optical fibers 104 against the optical waveguide structure 106, interposition members 110 interposed between the upstream fiber-holding lid 108_a_ and the optical waveguide structure 106, and an adhesive filled between any two of the optical fibers 102, 104, the optical waveguide structure 106, the fiber-holding lids 108_a_, 108_b_ and the interposition member 110 to fix them to each other.

The upstream optical fiber 102 and the downstream optical fibers 104 include respective cores 102_a_, 104_a_ extending longitudinally. Each of the optical fibers has a diameter of, for example, 125 μm.

The optical waveguide structure 106 has a substrate 114, and an optical waveguide 116 layered on the substrate 114.

The optical waveguide 116 has a core 116_a_ configured to form a desired path between the optical fibers 102, 104, and a cladding 116_b_ disposed around the core 116_a_. In this embodiment, in order to transmit light between the optical fibers 102, 104, the core 116_a_ has a single upstream port 120 aligned with the upstream optical fiber 102, and eight downstream ports 122 aligned with the respective downstream optical fibers 104. The core 116 of the optical waveguide 116 extends from the single upstream port 120, is branched toward a downstream side, and terminates eight downstream ports 122. The core 116_a_ and the cladding 116_b_ are made of, for example, fluorinated polyimide.

The substrate 114 has an upstream portion 114_a_ for supporting the upstream optical fiber 102, a central portion 114_b_ located adjacent to the upstream portion 114_a_ and layered with the optical waveguide 116, and a downstream portion 114_c_ for supporting the downstream optical fibers 104. The substrate 114 also has an upstream recessed portion 114_d_ between the upstream portion 114_a_ and the central portion 114_b_, and a downstream recessed portion 114_e_ between the central portion 114_b_ and the downstream portion 114_c_, the recessed portions 114_d_, 114_e_ opening upward and laterally. The substrate 114 is, for example, made of silicon.

The upstream portion 114_a_ of the substrate 114 has an upper surface 124 with a width W, and a support groove 126 in the upper surface 124, the groove 126 being longitudinally aligned with the upstream port 120 of the core 116_a_ of the optical waveguide 116 and configured to support and position the upstream optical fiber 102 on the support groove 126. Similarly, the downstream portion 114_c_ of the substrate 114 has an upper surface 128 with the width W, and eight support grooves 130 in the upper surface 128, the grooves 130 being longitudinally aligned with the respective downstream ports 122 of the core 116_a_ of the optical waveguide 116, and configured to support and position the downstream optical fibers 104 on the upper surface 128. Each of the support grooves 126, 130 has a cross-section formed so that the cores 102_a_, 104_a_ of the optical fibers 102, 104 are aligned with the core 116_a_ of the optical waveguide 116 when the optical fibers 102, 104 are supported and positioned on the respective support grooves 126, 130. In this embodiment, such a cross section is a V-shaped cross section. The upstream support groove 126 is located on a centerline WC relative to the width of the upper surface 124 (see FIG. 9).

Further, two non-support grooves 132_a_, 132_b_ are provided in the upper surface 124 of the upstream portion 114_a_, the grooves 132_a_, 132_b_ being respectively located on one side and the other side laterally relative to the center line WC and offset from the upstream port 120 of the core 116_a_ of the optical waveguide 116. Each of the non-support grooves 132_a_, 132_b_ has the same cross-sectional shape as that of the support groove 126.

The upstream fiber-holding lid 108*a* has the same width W as that of the substrate 114. As shown in FIG. 10, the fiber-holding lid 108*a* has a bottom surface 134 which is provided with a contact groove 136 extending longitudinally and configured to contact and hold the upstream optical fiber 102 against the substrate 114. Thus, the contact groove 136 is opposed to the support groove 126. In this embodiment, the contact groove 136 has a V-shaped cross section. The bottom surface 134 is further provided with two opposing grooves 138 opposing to the respective non-support grooves 132*a*, 132*b*. Each of the opposing grooves 138 has the same cross-sectional shape as that of the contact groove 136. Further, the bottom surface 134 is provided with grooves 140 having the same cross-sectional shape as that of the contact groove 136. These grooves 136, 138, 140 are arranged at even intervals. The upstream fiber-holding lid 108*a* has a centerline 108*c* extending longitudinally through a center of gravity thereof.

The downstream fiber-holding lid 108*b* has the same structure as that of the upstream fiber-holding lid 108*a* except that the former lid 108*b* has no opposing grooves 138 and the grooves 140, but eight contact grooves 136 opposing to the respective support grooves 130 in the upper surface 128 of the downstream portion 114*c* of the substrate 114. Thus, the same reference numbers as those of the components of the upstream fiber-holding lid 108*a* are attached to components of the downstream fiber-holding lid 108*b* similar to the components of the upstream fiber-holding lid 108*a*, and the explanation of the downstream fiber-holding lid 108*b* will be omitted.

Each of the interposition members 110 has the same cross-sectional shape as those of the optical fibers 102, 104, and the interposition members 110 are interposed between the non-support grooves 132*a*, 132*b* of the upstream portion 114*a* of the substrate 114 and the opposing grooves 138 of the upstream fiber-holding lid or member 108*a*. The interposition member 110 preferably has a value of thermal expansion coefficient equal to that of thermal expansion coefficient of the optical fibers 102, 104. Further, the interposition member 110 preferably has a value of elastic modulus equal to that of elastic modulus of the optical fibers 102, 104. This makes it possible to suppress phenomenon causing fluctuation of insertion loss of the optical-waveguide-type optical module 100, for example, fluctuation of axial misalignment, tilt and/or gap when an environmental temperature is changed, to be caused by changes in environmental temperature, resulting in reduction of the fluctuation of insertion loss. Thus, the interposition member 110 is preferable an optical fiber.

The upstream optical fiber 102 is supported and positioned on the support groove 126 of the upstream portion 114*a* so that the optical fiber 102 protrudes above the upstream recessed portion 114*d* and is located close to the upstream port 120 of the optical waveguide 116.

Similarly, each of the downstream optical fibers 104 is supported and positioned on the respective support grooves 130 of the downstream portion 114*c* so that the optical fibers 104 protrude above the downstream recessed portion 114*e* and are located close to the respective downstream ports 122 of the optical waveguide 116. The upstream optical fiber 102 and the downstream optical fibers 104 are fixed to the substrate 114, the optical waveguide 116 and the respective fiber-holding lids 108*a*, 108*b* by an adhesive 112. The adhesive is, for example, an ultraviolet curing type resin.

Although FIG. 11 shows the fiber-holding lid having V-shaped cross-sectional grooves, it may have a U-shaped cross-sectional groove or a flat surface without grooves. Further, the fiber-holding lid may be omitted. Specifically, in order to mount a group of optical fibers on the grooves, optical fibers disposed to transmit light to the waveguide core and other optical fibers which is capable of transmitting light but is disposed out of alignment with the waveguide core are adhesively fixed to the substrate by means of a jig for arranging both of the fibers on the substrate, pressing them against the substrate and fixing them to the substrate, and then the jig may be removed.

Next, an operation of the optical-waveguide-type optical module 100 will be explained.

Light transmitted through the single upstream optical fiber 102 is transmitted through the upstream port 120 to the optical waveguide 116, branched toward a downstream side, and transmitted through the eight downstream ports 122 to the eight downstream optical fibers 104. In this case, the optical-waveguide-type optical module 100 serves as an optical splitter. On the contrary, light may be traveled in the opposite direction from the downstream optical fibers 104 to the upstream optical fiber 102. In this case, the optical-waveguide-type optical module 100 serves as an optical coupler.

Next, one example of a production process for the optical-waveguide-type optical module including the optical waveguide structure which is the second embodiment of the present invention will be explained.

A substrate 114 made of silicon or a polymer material is prepared, and then subjected to an anisotropic etching process based on a resist pattern made by means of a photolithographic process so that the V-shaped cross-sectional support grooves 126, 130 and the non-support grooves 132*a*, 132*b* are formed. These V-shaped cross-sectional support grooves 126, 130 and the non-support grooves 132*a*, 132*b* are formed with submicron accuracy relative to the substrate 114. Preferable, the support grooves 126, 130 and the non-support grooves 132*a*, 132*b* have the same cross-sectional shape, and formed in the same substrate in the same fabrication process. This makes it possible to reduce dimensional errors between the non-support grooves 132*a*, 132*b* and the support grooves 126, 130 due to production variation. Thus, fluctuation of an insertion loss of the optical waveguide structure according to the above-stated method can be reduced more greatly than that of an insertion loss in cases that the non-support grooves 132*a*, 132*b* is formed in a process different from that of making the support grooves 126, 130, and that dimensions of the former grooves 132*a*, 132*b* is different from those of the latter grooves 126, 130.

Then, an optical waveguide 116 is formed on the substrate 114, in which the support grooves 126, 130 and the non-support grooves 132*a*, 132*b* are formed. Particularly, in a case where the optical waveguide 116 is made of a polymer material, after a cladding layer 116*b* and a core layer 116*a* on the clad layer 116*b* are formed by spin coating or molding, an optical waveguide core 116*a* having a rectangular cross section is formed from the core layer by means of a process such as photolithography and reactive ion etching or by means of a machining process such as crimping. Then, a further cladding layer 116*b* is formed in a manner similar to the forming way mentioned above to cover the optical waveguide core 116*a* so that the optical waveguide 116 is formed. Also, in a case where the optical waveguide 116 is made of quartz, after a quartz layer is formed on the substrate 114 by means of a process such as flame hydrate deposition and CVD, a quartz core 116*a* having a rectangular cross section is formed by means of a process such as dry etching and then a further cladding layer 116*b* is formed to cover the quartz core 116*a* so that the waveguide 116 is formed. The process of forming the support grooves 126, 130 and the non-support grooves 132*a*, 132*b* and the process of forming the optical waveguide 116 are performed so that, when the optical fibers 102, 104 are mounted on the support grooves 126, they are aligned with the core 116*a* of the optical waveguide 116 with submicron accuracy. Then, the upstream recessed portion 114*b* and the downstream recessed portion 114*a* are formed by means of a dicing process.

Then, an appropriate amount of adhesive 112 is applied to the support grooves 126, 130, the non-support grooves 132*a*, 132*b* and the upper surfaces 124, 128 of the substrate 114. The optical fibers 102, 104 are respectively disposed on the support grooves 126, 130 to protrude above the upstream recessed portion 114*b* and the downstream recessed portion 114*a*. Further, the interposition members 110 are disposed on the non-support grooves 132*a*, 132*b*. The fiber-holding lids 108*a*, 108*b* are pressed from above against the optical fibers 102, 104 at a predetermined pressure for a predetermined time to fix the optical fibers 102, 104 to the respective support grooves 126, 130. This press process is attentively performed to prevent gas bubbles from entering between each of the fiber-holding lids 108*a*, 108*b* and the substrate 114.

Figure 13:
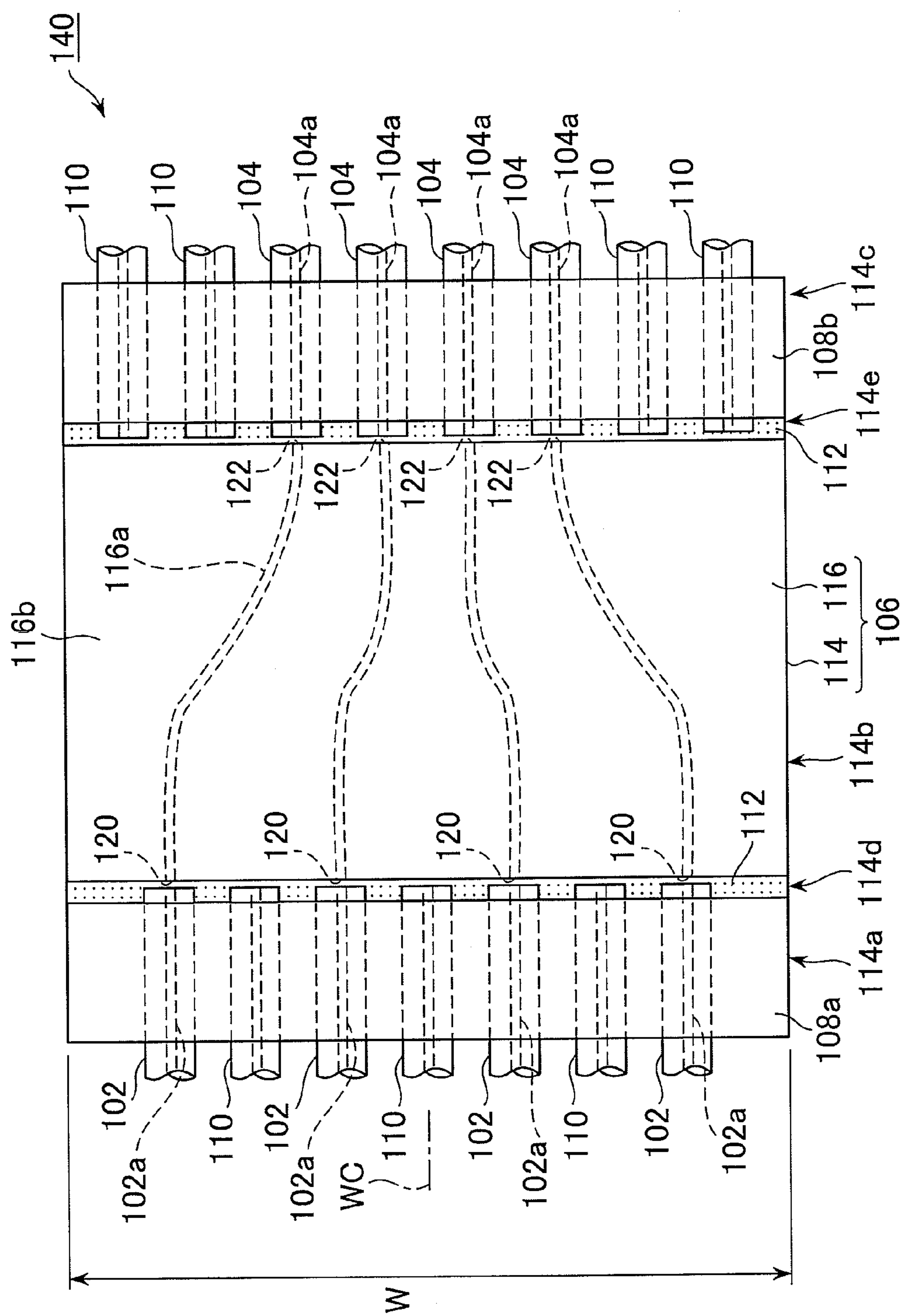
FIG. 13 is a top plan view showing an optical-waveguide-type optical module (pitch converter) including an optical waveguide structure according to a third embodiment of the present invention.

Next, referring to FIG. 13, an optical waveguide structure which is a third embodiment of the present invention will be explained. FIG. 13 is a top plan view showing an optical-waveguide-type optical module or pitch converter including an optical waveguide structure which is the third embodiment of the present invention.

The pitch converter 140 has components (former components) common to those of the optical-waveguide-type optical module 100 (latter components) shown in FIGS. 9-12 and including the optical waveguide structure which is the second embodiment of the present invention. In this connection, the former components common to the latter components are referred to the same reference numbers as those of the latter components and explanations of the former components are omitted. Different points of the pitch converter 140 relative to the aforementioned optical-waveguide-type optical module 100 are that the number of the upstream optical fibers 102 is four, that the interposition members 110 are disposed between the upstream optical fibers 102 adjacent to each other, that the number of the downstream optical fibers 104 is four, that two interposition members 110 are disposed on each of the opposed sides of the four downstream optical fibers 104 at the same intervals as those of the downstream optical fibers 104, that the cladding 116*b* of the optical waveguide 116 extends from the upstream optical fibers 102 to the downstream optical fibers 104 with one-to-one correspondence, that the support grooves 126, 130 (not shown in FIG. 13) and the contact grooves 136 (not shown in FIG. 13) are respectively arranged in the substrate 114 and the fiber-holding lids 108*a*, 108*b* at locations corresponding to the upstream optical fibers 102 and the downstream optical fibers 104, ant that the non-support groove 132*a*, 132*b* (not shown in FIG. 13) and the opposing grooves 138 (not shown in FIG. 13) are respectively arranged in the substrate 114 and the fiber-holding lids 108*a*, 108*b* at locations corresponding to the interposition members 110.

In this pitch converter 140, the downstream fiber-holding lid 108*b* supported on the downstream fibers 104 is substantially parallel to the substrate 112. However, if the four interposition members 110 are not provided, relatively large regions, for example, regions having a lateral length larger than the interval of the downstream fibers 104, are formed on the opposite sides of the four downstream optical fibers 104 so that the downstream fiber-holding lid 108*b* may be slightly inclined laterally relative to the substrate 112. In this embodiment, since the interposition members 110 are provided in the regions on the opposite sides of the downstream optical fibers 104, an inclination of the downstream fiber-holding lid 108*b* relative to the substrate 112 can be suppressed.

Next, referring to FIGS. 14-16, an optical fiber array which is a fourth embodiment of the present invention will be explained.

Figure 14:
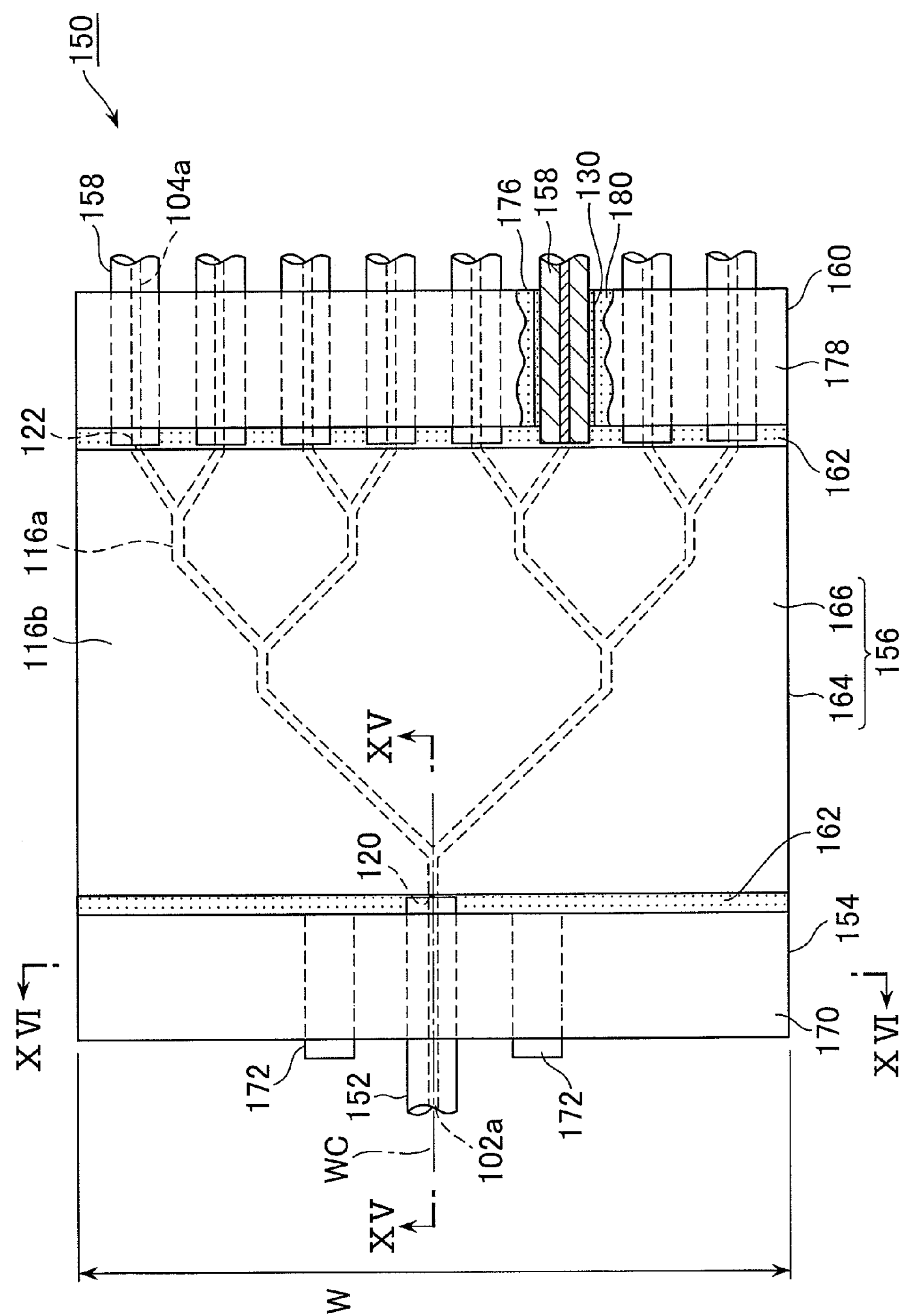
FIG. 14 is a top plan view showing an optical fiber array according to a fourth embodiment of the present invention. (The figure also illustrates an optical waveguide which is connected with the optical fiber array.)

FIG. 14 is a top plan view showing an optical module in which an optical fiber array which is the fourth embodiment of the present invention and an optical waveguide are coupled to each other. FIG. 15 is a fragmentary enlarged cross-sectional view taken along the line XV-XV in FIG. 14, and FIG. 16 is an enlarged cross-sectional view taken along the line XVI-XVI in FIG. 14.

Figure 15:
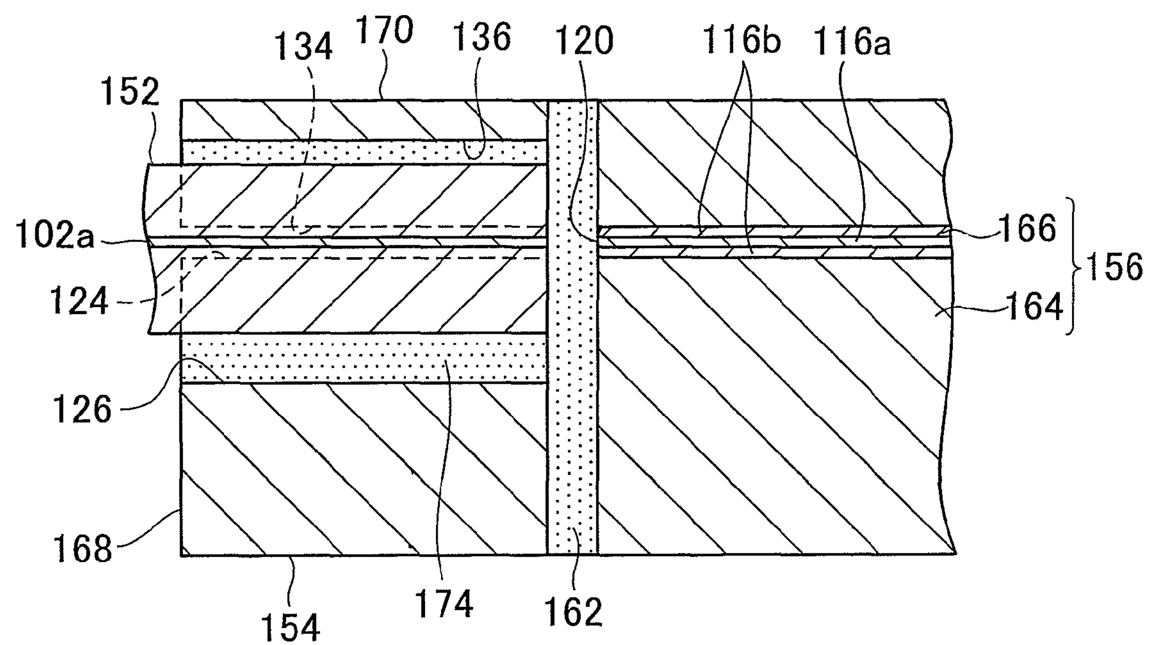
FIG. 15 is a fragmentary enlarged cross-sectional view taken along the line XV-XV in FIG. 14.
Figure 16:
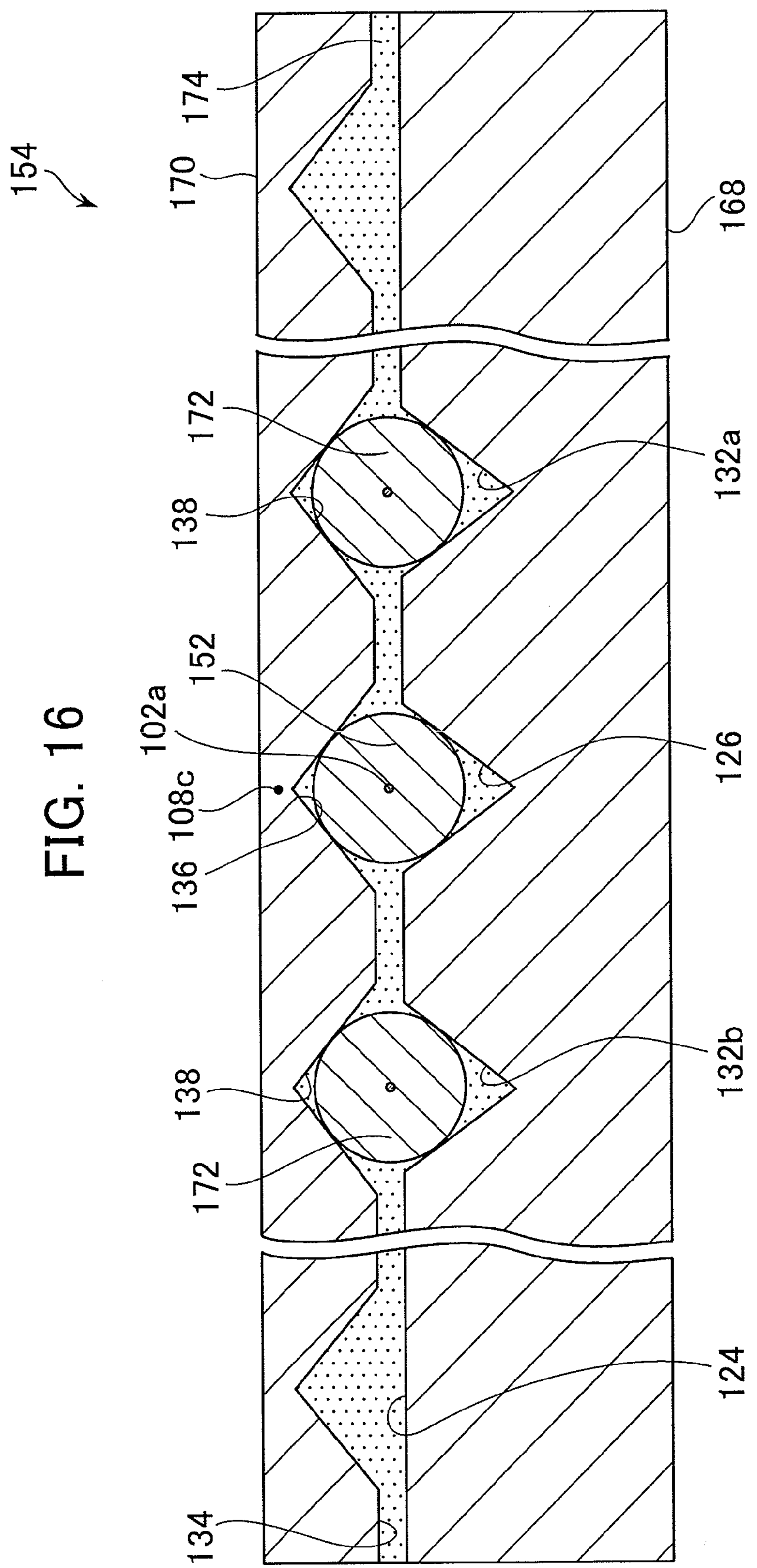
FIG. 16 is an enlarged cross-sectional view taken along the line XVI-XVI in FIG. 14.

As shown in FIGS. 14-16, an optical module 150 has an optical fiber array 154 according to the present invention including a single upstream optical fiber 152 extending longitudinally, an optical waveguide structure 156 connected to the upstream optical fiber 152, an optical fiber array 160 connected to the optical waveguide structure 156 and including eight downstream optical fibers 158 arranged laterally, and an adhesive 162 for fixing the optical fiber arrays 154, 160 to the optical waveguide structure 156.

The upstream optical fiber 152 and the downstream optical fibers 158 substantially have the same respective structures as those of the upstream optical fiber 102 and the downstream optical fiber 104 in the aforementioned second embodiment. Thus, components of the fibers 152, 158 corresponding to the components of the fibers 102, 104 are referred to the same reference numbers as those of the latter fibers 102, 104 and explanations of the former fibers 152, 158 are omitted.

The optical waveguide structure 156 has a substrate 164 and an optical waveguide 166 layered thereon. The substrate 164 and the optical waveguide 166 have substantially the same structures as those of the central portion 110*b* of the substrate 114 and the optical waveguide 116 in the aforementioned second embodiment, respectively. Thus, components of the substrate 164 and the waveguide 166 respectively corresponding to the components of the substrate 114 and the waveguide 116 are referred to the same reference numbers as those of the latter substrate 114 and the latter waveguides 116 and explanations of the former substrate 114 and the former waveguide 166 are omitted.

The optical fiber array 154 has a substrate 168 supporting the upstream optical fiber 152, an upstream fiber-holding lid 170 holding the upstream optical fiber 152 against the substrate 168, and an interposition members 172 interposed between the substrate 168 and the upstream fiber-holding lid 170. The substrate 168, the upstream optical fiber 152 and the upstream fiber-holding lid 170 are fixed to each other by an adhesive 174 filled in a space between any two of them. The substrate 168, the upstream fiber-holding lid 170, the interposition members 172 and the adhesive 174 have substantially the same structures as those of the upstream portion 114*a* of the substrate 114, the upstream optical fiber 108*a*, the interposition members 110 and the adhesive 112 in the aforementioned second embodiment, respectively. Thus, components of the substrate 168, the upstream fiber-holding lid 170, the interposition members 172 and the adhesive 174 respectively corresponding to the components of the upstream portion 114*a* of substrate 114, the upstream optical fiber 108*a*, the interposition members 110 and the adhesive 112 are referred to the same reference numbers as those of the latter components and explanations of the former components are omitted.

The optical fiber array 160 has a substrate 176 supporting the downstream optical fibers 158, and a downstream fiber-holding lid 178 holding the downstream optical fibers 158 against the substrate 176. The substrate 176, the downstream optical fibers 158 and the downstream fiber-holding lid 178 are fixed to each other by an adhesive 180 filled in a space between any two of them. The substrate 176, the downstream fiber-holding lid 178 and the adhesive 180 have substantially the same structures as those of the downstream portion 114*c* of the substrate 114, the downstream fiber-holding lid 108*b* and the adhesive 180 in the aforementioned second embodiment, respectively. Thus, components of substrate 176, the downstream fiber-holding lid 178 and the adhesive 180 respectively corresponding to the components of the downstream portion 114*c* of the substrate 114, the downstream fiber-holding lid 108*b* and the adhesive 180 are referred to the same reference numbers as those of the latter components and explanations of the former components are omitted.

Next, one example of a production process of the optical fiber array which is the fourth embodiment of the present invention will be explained.

A production process of the optical fiber array 154 is the same as that of the optical waveguide structure which is the second embodiment of the present invention except that the step of forming an optical waveguide is omitted. Thus, explanation of the production process of the optical fiber array 154 is omitted. After the optical fiber array 154 is cutout at an end surface thereof, the end surface may be ground in accordance with a conventional production process of an optical fiber array.

The embodiments of the present invention have been explained, but the present invention is not limited to the above-mentioned embodiments and it is apparent that the embodiments can be changed within the scope of the present invention set forth in the claims.

In the above embodiments, the optical-waveguide-type optical module has been explained as an optical splitter. However, any types of optical waveguide can be employed so that the optical-waveguide-type optical module may be an optical coupler, an optical coupling/splitting device or a pitch converter. In these modules, the terms "upstream" and "downstream" used in the present specification may be changed in accordance with a light-traveling direction therein, for example, the terms are exchanged each other.

In the first embodiment, each of the grooves of the upstream groove array 8 and the downstream groove array 10 is provided with a V-shaped cross section. However, the groove may have any other suitable cross-sectional shape allowing an optical fiber to be supported and positioned on the substrate and such a shape may be a U-shape or a rectangular shape. Further, the groove on which any optical fiber is mounted may have any shape and dimensions, such as width, length and depth, as long as such a shape and dimensions allow a thickness of the lower cladding layer at any one port to become close to that of the lower cladding layer at the other one port.

In the first embodiment, the number of the downstream fibers is greater than that of the upstream optical fibers. However, the number of the downstream fibers may be equal to that of the upstream optical fibers, as long as an insertion loss of the optical module can be reduced as compared with the conventional optical module.

In the first embodiment, the number of the upstream optical fibers mounted on the optical waveguide structure 6 is one. In this case, an effect of reducing an insertion loss of the optical module is considered to be great. However, the number of the upstream optical fibers may be two or more as long as an insertion loss of the optical module can be reduced as compared with the conventional optical module.

In the first embodiment, the grooves in the upstream groove array 8 and the downstream groove array 10 are arranged over the entire width of the optical waveguide structure 6. However, they may be partially arranged along the entire width of the optical waveguide structure 6. For example, in the upstream groove array 8, only the grooves 8*c*, 8*d* or the grooves 8*c*, 8*d*, 8*e* may be provided, namely, the grooves 8*a*, 8*b*, (8*e*), 8*f*, 8*g* may be omitted.

In the first embodiment, the all grooves in the upstream groove array 8 and the downstream groove array 10 are arranged at even intervals. However, each interval of the adjacent grooves may be arbitrarily as long as such an interval allows a thickness of the lower cladding layer at any one port to become close to that of the lower cladding layer at the other one port. For example, in the upstream groove array 8, intervals between the grooves 8*c* and 8*d* and between the grooves 8*d* and 8*e* may be equal to the intervals between the adjacent grooves of the downstream groove array 10, while an interval between the grooves 8*a* and 8*b* may be greater than the intervals between the adjacent grooves of the downstream groove array 10. Further, a value of intervals between the adjacent grooves of the upstream groove array 8 may be different from that of intervals between the adjacent grooves of the downstream groove array 10.

In the first embodiment, the downstream optical fibers 4 are mounted on all of the grooves 10*a*-10*h* of the downstream groove array 10. However, there may be (a) groove(s) on which the downstream optical fiber is/are mounted.

In the first embodiment, the grooves of the upstream groove array 8 are shifted laterally relative to the grooves of the downstream groove array 10. However, the former grooves may be opposing to the latter grooves, as long as an amount of light leakage is ignorable.

In the second, third and fourth embodiments, each of the support grooves 126, 130 and the non-support grooves 132*a*, 132*b* is provided with a V-shaped cross section. However, the groove may have any other suitable cross-sectional shape allowing an optical fiber to be supported and positioned on the substrate and such a shape may be a U shape or a rectangular shape.

In the second, third and fourth embodiments, each of the contact grooves 136 of the upstream fiber-holding lids 108*a*, 170 is provided with a V-shaped cross section. However, the groove may have any other suitable cross-sectional shape allowing the upstream optical fiber 102, 152 to be hold against the substrate and such a shape may be a U shape or a rectangular shape. Further, the contact groove 136 in the bottom surface 134 may be omitted, as long as the upstream optical fiber 102, 152 can be hold against the substrate. The upstream fiber-holding lid 108*a*, 170 may bring into direct contact with the upstream optical fiber 102, 152, or the adhesive 112 may be interposed between the upstream fiber-holding lid 108*a*, 170 and the upstream optical fiber 102, 152.

In the second and fourth embodiments, the support groove 126 supporting the upstream optical fiber 102, 152 is centrally disposed in the upper surface 124 in the lateral direction. However, the support groove 126 may be located out of the center, or the plurality of support grooves 126 may be located on either side of the opposite sides of a center line 108*c* of the upstream fiber-holding lid 108*a*, 170, as long as the center line 108*c* is located between the support groove and the non-support groove.

In the second and fourth embodiments, the number of the interposition members 110, 172 is two, but it may be one, three or more. In this connection, according to the number of the interposition members 110, 172, a corresponding number of the non-support grooves 132*a*, 132*b* and the opposing grooves 138 may be provided. Alternatively, the non-support grooves 132*a*, 132*b* and the opposing grooves are provided more than the interposition members 110, 172.

What is claimed is:

1. An optical waveguide structure comprising:

a substrate having an upper planar surface formed with a first groove array and a second groove array which are longitudinally spaced from each other, each groove array including a plurality of anisotropically-etched V-shaped cross-sectional grooves extending longitudinally and arranged laterally relative to each other, said grooves being laterally spaced from each other via the upper planar surface and formed with submicron accuracy; and an optical waveguide made of polymer and integrally layered on the upper planar surface of the substrate between the first and second groove arrays;

wherein the optical waveguide has a lower cladding directly layered on the upper planar surface of the substrate, and has a core on the lower cladding layered on the substrate so that, when optical fibers are supported and positioned on the grooves of the first and second groove arrays, the core of the optical waveguide becomes aligned with cores of the optical fibers at the same level in a vertical direction;

wherein the optical waveguide is an optical waveguide formed by applying a polymer material for the lower cladding onto the upper planar surface of the substrate formed with the V-shaped cross-sectional grooves and applying a polymer material for the core onto the polymer material for the lower cladding, so that portions of the polymer material for the lower cladding intruding into the V-shaped cross-sectional grooves are depressed to pull the polymer material from the lower cladding around the V-shaped cross-sectional grooves, toward the V-shaped cross-sectional grooves, wherein, in order to allow light transmission between optical fibers positioned at the respective first and second groove arrays, the optical waveguide has at least one first port aligned with (a) groove(s) of the first groove array, and second ports aligned with grooves of the second groove array, the number of the second ports being greater than that of the first port(s); and wherein the grooves of each of the first groove array and the second groove array are arranged over the entire width of the optical waveguide structure at even intervals, and the intervals of the grooves of the first groove array are equal to those of the grooves of the second groove array so that the grooves of the first groove array include an aligned groove aligned with the first port, and a non-aligned groove arranged laterally adjacent to the aligned groove, the non-aligned groove being located out of alignment with any first ports of the core of the waveguide so that a thickness of the lower cladding at the first port is brought closer to that of the cladding at the second port.

2. The optical waveguide structure according to claim 1, wherein the grooves of the first groove array includes an aligned groove aligned with the first port, and two side grooves arranged adjacent to the aligned groove on the opposite sides thereof and equally spaced therefrom in a lateral direction; and at least one of the side grooves is located out of alignment with any first ports.

3. The optical waveguide structure according to claim 1, wherein the grooves of the first groove array and the grooves of the second groove array are laterally shifted from each other and alternately arranged.

4. An optical-waveguide-type optical module comprising:

the optical waveguide structure according to claim 1;

a first optical fiber positioned on the groove of the first groove array and aligned with the first port; and a second optical fiber positioned on the grooves of the second groove array and aligned with the second port.

5. The optical waveguide structure according to claim 1, wherein said cladding directly layered on the substrate is a cladding formed by spin-coating material thereof directly on the substrate after the substrate is formed with the first and second groove arrays.

6. The optical waveguide structure according to claim 1, wherein thicknesses of the lower cladding at the grooves of the first groove array and at the grooves of the second groove array are substantially equal to each other.

7. The optical waveguide structure according to claim 6, wherein a thickness of the lower cladding at a location of the substrate intermediate the first groove array and the second groove array is different than that at the grooves of the first and second groove arrays.

8. An optical waveguide structure comprising:

a substrate having an upper planar surface formed with a first groove array and a second groove array which are longitudinally spaced from each other, each groove array including a plurality of anisotropically-etched V-shaped cross-sectional grooves extending longitudinally and arranged laterally relative to each other, said grooves being laterally spaced from each other via the upper planar surface and formed with submicron accuracy; and an optical waveguide made of polymer, integrally layered on the upper planar surface of the substrate between the first and second groove arrays;

wherein the optical waveguide has a lower cladding directly layered on the upper planar surface of the substrate, and has a core on the lower cladding layered on the substrate so that, when optical fibers are supported and positioned on the grooves of the first and second groove arrays, the core of the optical waveguide becomes aligned with cores of the optical fibers at the same level in a vertical direction;

wherein the optical waveguide is an optical waveguide formed by applying a polymer material for the lower cladding onto the upper planar surface of the substrate formed with the V-shaped cross-sectional grooves and applying a polymer material for the core onto the polymer material for the lower cladding, so that portions of the polymer material for the lower cladding intruding into the V-shaped cross-sectional grooves are depressed to pull the polymer material from the lower cladding around the V-shaped cross-sectional grooves, toward the V-shaped cross-sectional grooves, wherein, in order to allow light transmission between optical fibers positioned at the respective first and second groove arrays, the core of the optical waveguide has at least one first port aligned with (a) groove(s) of the first groove array and at least one second port aligned with (a) groove(s) of the second groove array, the number of the second ports being equal to the number of the first ports; and wherein the grooves of each of the first groove array and the second groove array are arranged over the entire width of the optical waveguide structure at even intervals and the intervals of the grooves of the first groove array are equal to the intervals of the grooves of the second groove array so that the V-shaped cross-sectional grooves include a first aligned groove aligned with the first port, a first non-aligned groove arranged laterally adjacent to the first aligned groove, a second aligned groove aligned with the second port; and a second non-aligned groove arranged laterally adjacent to the second aligned groove, the first and second non-aligned grooves being located out of alignment with any first and second ports respectively so that a thickness of the lower cladding at the second port is brought closer to that of the cladding at the first port.

9. The optical waveguide structure according to claim 8, wherein the grooves of the first groove array and the grooves of the second groove array are laterally shifted from each other and alternately arranged.

10. An optical-waveguide-type optical module comprising:

the optical waveguide structure according to claim 8;

a first optical fiber positioned on the groove of the first groove array and aligned with the first port; and a second optical fiber positioned on the grooves of the second groove array and aligned with the second port.

11. The optical waveguide structure according to claim 8, wherein said cladding directly layered on the substrate is a cladding formed by spin-coating material thereof directly on the substrate after the substrate is formed with the grooves.

12. The optical waveguide structure according to claim 8, wherein the grooves of the first groove array include an aligned groove aligned with the first port, and two side grooves arranged adjacent to the aligned groove on the opposite sides thereof and equally spaced therefrom in a lateral direction; and at least one of the side grooves is located out of alignment with any first ports.

13. The optical waveguide structure according to claim 8, wherein thicknesses of the lower cladding at the grooves of the first groove array and at the grooves of the second groove array are substantially equal to each other.

14. The optical waveguide structure according to claim 13, wherein a thickness of the lower cladding at a location of the substrate intermediate the first groove array and the second groove array is different than that at the grooves of the first and second groove arrays.

15. An optical-waveguide-type optical module comprising:

a substrate having a support portion for supporting an optical fiber extending longitudinally; an optical fiber supported on the support portion;

an optical waveguide layered on the substrate adjacent to the support portion of the substrate and having a core for transmitting light between the optical fiber supported by the support portion and the core of the optical waveguide;

a holding member holding the optical fiber against the support portion of the substrate; and an adhesive filled in a space between any two of the support portion, the optical fiber and the holding member to fix the optical fiber to the support portion;

wherein the support portion has an upper surface and a support groove formed in the upper surface for supporting the optical fiber and aligned longitudinally with the core of the optical waveguide, the support groove being located on a centerline extending longitudinally through a center of gravity of the holding member or on one lateral side of the centerline; and wherein the support portion further has at least one non-support groove formed in the upper surface out of alignment with the core of the optical waveguide and located on the centerline or on the other lateral side of the centerline, the non-support groove having the same cross-sectional shape as that of the support groove;

the optical-waveguide-type optical module further comprising at least one interposition member interposed between the non-support groove and the holding member, the interposition member having the same cross-sectional shape as that of the optical fiber.

16. An optical fiber array configured to be coupled to an optical waveguide structure to form an optical module, comprising:

a support substrate for supporting an optical fiber extending longitudinally;

an optical fiber supported by the support substrate;

a holding member holding the optical fiber against the support substrate; and an adhesive filled in a space between any two of the support substrate, the optical fiber and the holding member to fix the optical fiber to the support substrate;

wherein the support substrate has an upper surface and a support groove formed in the upper surface for supporting the optical fiber and aligned longitudinally with a core of the optical waveguide, the support groove is located on a centerline extending longitudinally through a center of gravity of the holding member or on one lateral side of the centerline; and wherein the support substrate further has at least one non-support groove formed in the upper surface out of alignment with the core of the optical waveguide and located on the centerline or on the other lateral side of the centerline, the non-support groove having the same cross-sectional shape as that of the support groove;

the optical fiber array further comprising at least one interposition member interposed between the non-support groove and the holding member, the interposition member having the same cross-sectional shape as that of the optical fiber.

* * * * *